US011068145B2

(12) United States Patent
Breymann et al.

(10) Patent No.: US 11,068,145 B2
(45) Date of Patent: Jul. 20, 2021

(54) TECHNIQUES FOR CREATIVE REVIEW OF 3D CONTENT IN A PRODUCTION ENVIRONMENT

(71) Applicant: DISNEY ENTERPRISES, INC., Burbank, CA (US)

(72) Inventors: Michael Breymann, San Francisco, CA (US); Anthony M. Accardo, Los Angeles, CA (US); Evan A. Binder, Los Angeles, CA (US); Katharine S. Navarre, Santa Monica, CA (US); Gino Guzzardo, Los Angeles, CA (US); Miquel Angel Farre Guiu, Bern (CH)

(73) Assignee: Disney Enterprises, Inc., Burbank, CA (US)

( * ) Notice: Subject to any disclaimer, the term of this patent is extended or adjusted under 35 U.S.C. 154(b) by 49 days.

(21) Appl. No.: 16/192,633

(22) Filed: Nov. 15, 2018

(65) Prior Publication Data
US 2020/0159396 A1 May 21, 2020

(51) Int. Cl.
G06F 3/0482 (2013.01)
G06F 3/0481 (2013.01)
G06T 19/20 (2011.01)
G06F 3/0484 (2013.01)
G06T 7/11 (2017.01)
G06T 7/187 (2017.01)

(52) U.S. Cl.
CPC ........ G06F 3/04847 (2013.01); G06F 3/0482 (2013.01); G06F 3/04815 (2013.01); G06T 7/11 (2017.01); G06T 7/187 (2017.01); G06T 19/20 (2013.01)

(58) Field of Classification Search
CPC ......... G06T 2219/004; G06T 2219/024; G06T 19/20; G06T 19/003; G06T 7/187; G06T 7/11; G06F 3/04847; G06F 3/04815; G06F 3/0482
See application file for complete search history.

(56) References Cited

U.S. PATENT DOCUMENTS

| 2002/0188630 | A1* | 12/2002 | Davis | G06T 19/00 715/202 |
| 2010/0135598 | A1* | 6/2010 | Olwen | G06F 16/40 382/306 |
| 2016/0018967 | A1* | 1/2016 | Sato | G06T 13/00 715/733 |
| 2016/0133294 | A1* | 5/2016 | Dyer-Smith | G11B 27/031 386/241 |

(Continued)

Primary Examiner — Daniel Samwel
(74) Attorney, Agent, or Firm — Artegis Law Group, LLP

(57) ABSTRACT

Various embodiments of the invention disclosed herein provide techniques for automatically displaying and providing electronic feedback about a 3D production asset. A client device executing a software application receives an asset data bundle associated with the 3D production asset. The client device generates a customized user interface based on at least one aspect of the asset data bundle. The client device displays the 3D production asset via the customized user interface. The client device receives an input associated with the 3D production asset via the customized user interface. The client device causes the input to be transmitted to at least one of a media content server and a production database.

20 Claims, 18 Drawing Sheets

(56) References Cited

U.S. PATENT DOCUMENTS

| | | | |
|---|---|---|---|
| 2016/0147728 A1* | 5/2016 | Behr | H04L 12/1827 |
| | | | 715/753 |
| 2016/0321841 A1* | 11/2016 | Christen | G02B 27/017 |
| 2017/0053455 A1* | 2/2017 | Chen | G06T 9/00 |
| 2017/0337742 A1* | 11/2017 | Powderly | G06F 3/04815 |
| 2017/0373870 A1* | 12/2017 | Hrustanovic | H04L 63/062 |
| 2018/0189255 A1* | 7/2018 | Kofman | G06F 40/169 |
| 2019/0236842 A1* | 8/2019 | Bennett | G06Q 10/10 |

* cited by examiner

TECHNIQUES FOR CREATIVE REVIEW OF 3D CONTENT IN A PRODUCTION ENVIRONMENT

BACKGROUND OF THE INVENTION

Field of the Invention

The present invention relates generally to distributed media production and, more specifically, to techniques for creative review of three-dimensional content in a production environment.

Description of the Related Art

Media productions can include any form of audio and video content for use in feature films, computer games, television broadcast, commercials, online media, and so on. Media productions typically involve live action, animation, or a mix of live action and animation. Media productions that involve animation often include two-dimensional (2D) and three-dimensional (3D) computer-generated production assets (also referred to herein as "elements"), where each such asset contributes a visual and/or audio component to the media production. Such production assets can include computer-generated characters, virtual sets, light sources, and virtual cameras.

Production assets used in media productions typically are generated by members of a production team that can include computer artists, animators, lighting designers, set designers, and so on. Production assets usually are generated in an iterative fashion, where one or more production team members generate an initial version of a production asset and then modify that production asset multiple times before finalizing the production asset for use in a media production. During this process, the production team members submit the production asset one or more times to one or more stakeholders for review and approval. These stakeholders can include the director, the cinematographer, production department heads, and producers. The relevant stakeholders review the production asset and either approve the production asset or generate various annotations to the production asset describing what aspects of the production asset need to be modified. Based on the annotations, the production team members modify the production asset accordingly and then submit the production asset to the stakeholders again for review and approval. After each such iteration, the production asset becomes more refined and closer to what the stakeholders envision for the final version of the production asset. Again, the production team members and the stakeholders proceed through this iterative process until each production asset is ready for incorporation into the media production.

The iterative design and approval process described above can be broken into a series of phases. During the concept phase, the production team generates mood boards and color style frames, which are 2D collages of graphic designs, patterns, illustrations, and colors that may be used in the final media production. After the stakeholders approve the mood boards and color style frames, the production team enters a design phase. During the design phase, the production team generates 2D story boards that outline the plot along with primitive animation models of the main characters. Again, the stakeholders have to review and approve the story boards and character animations. During the refinement phase, the production team generates higher resolution 3D characters and animations with proper shading, virtual sets, lighting models, visual effects, and so on. In general, the 2D assets generated during earlier phases, such as mood boards, color style frames, and story boards, are referred to herein as "pre-production assets." The 3D assets generated during later phases, such as 3D characters and animations with proper shading, virtual sets, lighting models, visual effects, are referred to herein as "production assets." Various stakeholders continue to provide review, feedback, and approval at each such development stage of the media production. Generally, one or more production coordinators track the production assets generated by the production team that are awaiting review and route feedback about each production asset reviewed by the stakeholders back to the production team for implementation in the next iteration.

One drawback to the iterative design and review process described above is that the pre-production assets generated during earlier phases of production are not easily imported into the software applications used to generate and refine the final production assets during later phases of production. In general, the later phases of production include 3D production assets, which can look more realistic and have better motion characteristics relative to corresponding 2D pre-production assets. However, software applications for generating 2D pre-production assets during early phases of production do not readily interface with software applications for generating corresponding 3D production assets during later phases of production. As a result, the production team typically needs to recapture and regenerate 2D pre-production assets, such as mood boards, story boards, and primitive character animations into a 3D data space that can be used in the later phases of production. Therefore, when a production team member generates a 3D animated character based on a corresponding 2D animated character, the 2D animated character is generally discarded. As a result, the production team member generates the 3D animated character a second time, and is typically unable to leverage any of the work expended on generating the corresponding 2D animated character.

Another drawback of the above process is that the production team normally renders 3D production assets into a 2D movie clip when submitting the 3D production assets to stakeholder for review. Consequently, the stakeholders have only limited options when reviewing production assets. In particular, the stakeholders can view 3D product assets only from angles represented in the 2D movie clip. In addition, the stakeholders are unable to make lighting and shading adjustments when reviewing a 3D production asset. Yet another drawback of the above process is that manually tracking the review process by production coordinators can be labor intensive and error-prone, which can result in certain production assets not being reviewed on time and/or feedback not being received by the production team.

As the foregoing illustrates, what is needed in the art are more effective techniques for reviewing 3D production assets when developing a media production.

SUMMARY OF THE INVENTION

Various embodiments of the present application set forth a computer-implemented method for automatically displaying and providing electronic feedback about a 3D production asset. The method includes receiving an asset data bundle associated with the 3D production asset. The method further includes generating a customized user interface based on at least one aspect of the asset data bundle. The method further includes displaying the 3D production asset via the customized user interface. The method further includes receiving an input associated with the 3D production asset via the customized user interface. The method further includes causing the input to be transmitted to at least one of a media content server and a production database.

Other embodiments of the present invention include, without limitation, a computer-readable medium including instructions for performing one or more aspects of the disclosed techniques, as well as a computing device for performing one or more aspects of the disclosed techniques.

At least one technical advantage of the disclosed techniques relative to the prior art is that stakeholders are able to directly review 3D production assets, including manipulating the production asset in 3D and navigating through the 3D display space. Via a customized graphical user interface (GUI), the stakeholder may adjust certain parameters and be constrained from adjusting other parameters, thereby limiting stakeholder review to specific types of feedback needed by the production team. Further, an executable application and/or other information for generating the customized GUI may be downloaded once, when a new 3D production asset is initially reviewed. As a result, during subsequent review and annotation iterations, only the revised 3D production asset is downloaded without downloading the executable application and/or other information again. Another technical advantage of the disclosed techniques is that stakeholders are automatically notified when new production assets are available. In addition, the production team is automatically notified when new annotation media and metadata for a production asset has been transmitted to a media content server and/or a production database. As a result, creative review of production assets is more efficient, less labor intensive, and more focused relative to prior art approaches. These advantages represent one or more technological improvements over prior art approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
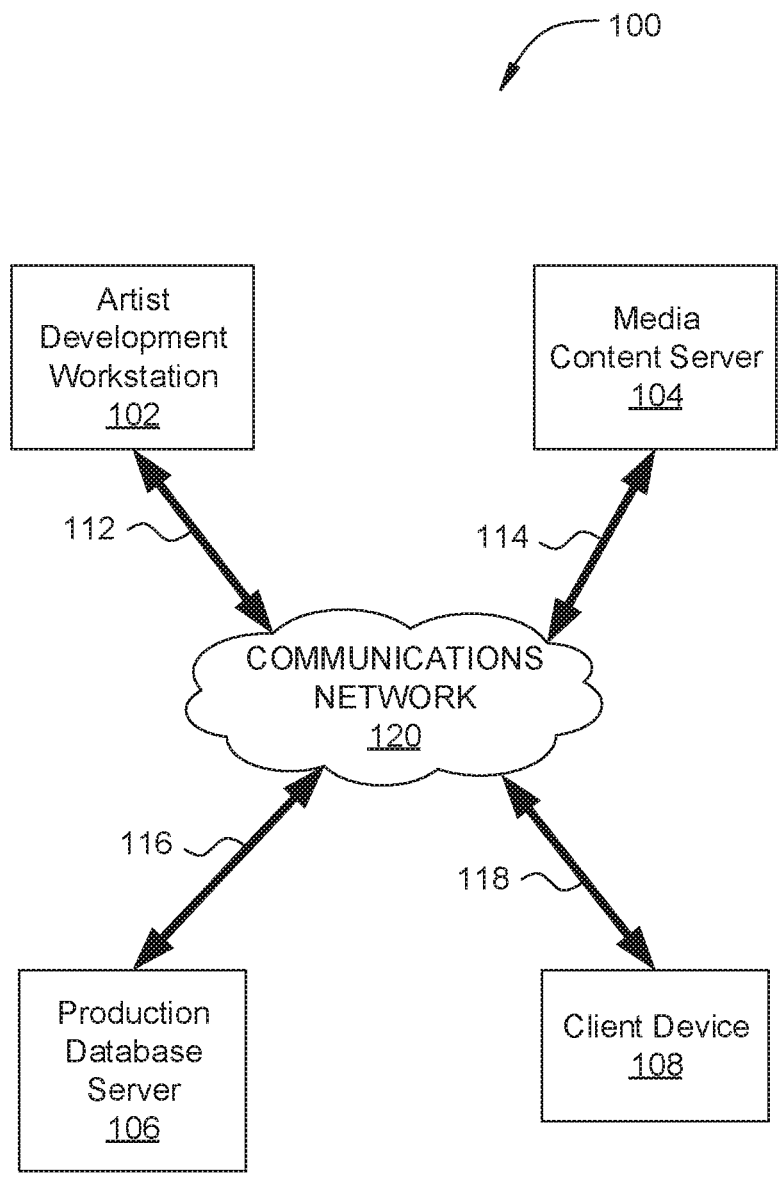
FIG. 1 illustrates a system configured to implement one or more aspects of the present invention.

FIG. 1 illustrates a system 100 configured to implement one or more aspects of the present invention. As shown, the system includes, without limitation, an artist development workstation 102, a media content server 104, a production database 106, and a client device 108, in communication with each other via a communications network 120. Communications network 120 may be any suitable environment to enable communications among remote or local computer systems and computing devices, including, without limitation, wireless and wired LANs (Local Area Networks) and internet-based WANs (Wide Area Networks).

Artist development workstation 102 includes, without limitation, a computing device that may be a standalone server, a cluster or "farm" of servers, one or more network appliances, or any other device suitable for implementing one or more aspects of the present invention. Illustratively, artist development workstation 102 communicates over communications network 120 via communications link 112.

As further described herein, an artist or other production team member, working at artist development workstation 102, generates a 3D production asset for review by one or more stakeholders. Artist development workstation 102 publishes the 3D production asset by transmitting an asset data bundle to media content server 104. The asset data bundle may include, without limitation, a downloadable and/or streamable set of 3D models, animation rigs, character skeletal definitions, blend shapes, textures, shaders, materials, animation, vertex caches, lights, cameras, edit decision lists, timecode, sequence layers, scene descriptions, metadata, audio, and text, in any technically feasible combination. In parallel, artist development workstation 102 publishes asset metadata to production database 106. Further, artist development workstation 102 transmits an alert to one or more stakeholders to notify the stakeholders that a new production asset is available for creative review. The alert may be in the form of an email, an instant message text, or any other technically feasible notification format.

Media content server 104 includes, without limitation, a computing device that may be a standalone server, a cluster or "farm" of servers, one or more network appliances, or any other device suitable for implementing one or more aspects of the present invention. Illustratively, media content server 104 communicates over communications network 120 via communications link 114.

As further described herein, media content server 104 receives asset data bundles related to particular production assets from artist development workstation 102 and stores the asset data bundles on one or more data stores. Media content server 104 receives requests for access to particular production assets from client device 108. In response, media content server 104 transmits the corresponding asset data bundle to client device 108. Further, upon completion of creative review of a particular production asset, media content server 104 receives annotation media from client device 108. Media content server 104 stores the annotation media on one or more data stores. Upon receiving a request for certain annotation media from a computing device, such as artist development workstation 102, media content server 104 transmits the requested annotation media to the computing device.

Production database 106 includes, without limitation, a storage device that may be a standalone networked attached storage (NAS) system, a storage area-network (SAN), a cluster or "farm" of storage devices, a distributed storage architecture, or any other device suitable for implementing one or more aspects of the present invention. In addition or alternatively, production database 106 may include, without limitation, a computing device with a storage subsystem that may be a standalone server, a cluster or "farm" of servers, one or more network appliances, or any other device suitable for implementing one or more aspects of the present invention. Illustratively, production database 106 communicates over communications network 120 via communications link 116. Production database 106 stores asset metadata and annotation metadata associated with various production assets, along with any other information to perform one of more of the techniques disclosed herein.

As further described herein, production database 106 receives asset metadata related to particular production assets from artist development workstation 102 and stores the asset metadata on one or more data stores. Production database 106 receives requests for access to particular production assets from client device 108. In response, production database 106 transmits the corresponding asset metadata to client device 108. In general, asset metadata includes information about the corresponding asset data bundle that artist development workstation 102 is publishing for review.

Upon completion of creative review of a particular production asset, production database 106 receives annotation metadata from client device 108. Production database 106 stores the annotation media on one or more data stores. Upon receiving a request for certain annotation metadata from a computing device, such as artist development workstation 102, production database 106 transmits the requested annotation metadata to the computing device.

Upon receiving annotation metadata, production database 106 may store the annotation metadata separately from the corresponding asset metadata. Additionally or alternatively, production database 106 may append the annotation metadata to the corresponding asset metadata. Annotation metadata includes information relating to the annotation media, if any, that client device 108 publishes as feedback regarding the corresponding 3D production asset. Some forms of annotation metadata stand alone and do not reference any associated annotation media. For example, an item of annotation metadata could include textual information and/or binary data values that include a response that a stakeholder has entered into the annotation metadata via client device 108. The textual information and/or binary data values could be a selection of "Option B" where, the customized GUI includes a graphical element for selecting on of options A, B, or C. The annotation that specifies "Option B" would not reference any corresponding item of annotation media. Some forms of annotation metadata do reference an associated annotation media item. For example, an item of annotation metadata could include information that related to a corresponding annotation media item, such as a drawing image, that the stakeholder has entered into the annotation media via client device 108. Such an annotation metadata item would include a link or reference to the corresponding annotation media item. In some embodiments, where a relationship exists between annotation metadata and asset metadata, the annotation metadata may be linked to, referenced by, and/or appended to the corresponding asset metadata in the database. In some embodiments, the annotation metadata may not be linked to, referenced by, or appended to the corresponding asset metadata in the database.

Client device 108 includes, without limitation, a computing device that may be a personal computer, video game console, personal digital assistant, mobile phone, mobile device, or any other device suitable for implementing one or more aspects of the present invention. Illustratively, client device 108 communicates over communications network 120 via communications link 118. Communications link 118 may be any technically feasible communication channel, including, without limitation, point-to-point communications channels, one or more LANs, and one or more internet-based WANs.

As further described herein, client device 108 receives alerts of new production assets that are ready for creative review. Upon receiving an alert, a stakeholder associated with client device 108 requests access to the new 3D production asset via a client device. Client device 108 transmits the request to one or both of media content server 104 and production database 106. Client device 108 then receives the asset data bundle and asset metadata from media content server 104 and production database 106, respectively. Based on data included in one or both of the asset data bundle and asset metadata, client device 106 automatically generates a customized graphical user interface (GUI) and displays the customized GUI on a display device associated with client device 108. The customized GUI is also referred to herein as a user interface/user experience display (UI/UX). The customized GUI facilitates receiving electronic feedback about the production assets and distributing that feedback to other machines, such as artist development workstation 102, media content server 104, production database 106. The customized GUI may be based on the discipline of the artist that generated the production asset via artist development workstation 102. Additionally or alternatively, the customized GUI may be based on the type of production asset. Additionally or alternatively, the customized GUI may be based on a production function associated with client device 108. Additionally or alternatively, the customized GUI may be based on any other technically feasible information related to the production asset. Via the customized GUI, client device 108 receives modifications to one or more characteristics of the production asset. Further, client device 108 receives annotations related to the production asset via various mechanisms. The annotations may include, without limitation, text, audio, drawings, diagrams, data structures, data types, and markup, in any technically feasible combination. In some embodiments, annotations may be attached to a specific point in time along an animation timeline.

After the stakeholder has completed creative review, client device 108 publishes the modifications to the characteristics of the production asset as annotation media and annotation metadata. In so doing, client device 108 transmits the annotation media and the annotation metadata to media content server 104 and production database 106, respectively. Client device 108 transmits an alert to one or more computing devices, such as artist development workstation 102. The alert notifies the artist and/or one or more other members of the production team that the creative review of the production asset is complete. The artist and/or other production team members then review the related annotation media and annotation metadata and incorporate the annotations as appropriate for the next round of creative review.

In general, media content server 104 stores the asset data bundle for the 3D production asset to be displayed on client device 108. Similarly, media content server 104 stores the annotation media for the 3D production asset to be displayed on artist development workstation 102. Production database 106 stores asset metadata corresponding to asset data bundles stored on media content server 104. Similarly, production database 106 stores annotation metadata corresponding to annotation media stored on media content server 104. Asset metadata data and annotation metadata are typically in the form of textual information and/or binary data values. Asset metadata data and annotation metadata may link to or refer to corresponding asset data bundles and annotation media, respectively, stored on media content server 104. Application software executing on client device 108 retrieves asset data bundles stored on media content server 104 based on corresponding asset metadata stored on production database 106. Similarly, application software executing on artist development workstation 102 retrieves annotation media stored on media content server 104 based on corresponding annotation metadata stored on production database 106.

It will be appreciated that the system shown herein is illustrative and that variations and modifications are possible. In one example, although the system 100 of FIG. 1 is illustrated with one artist development workstation 102, one media content server 104, one production database 106, and one client device 108, the system 100 could include any technically feasible number of artist development workstations 102, media content servers 104, production databases 106, and client devices 108 within the scope of the present disclosure. In another example, the asset data bundles and annotation media are described as being stored on media content server 104. Similarly, annotation metadata is described as being stored on production database 106. However, any data could be stored on any technically feasible computing device or storage device that is in communication with communications network 120. In yet another example, 3D production assets, annotation media, and annotation metadata could be stored in one or more servers in a cloud environment, media content server 104, and production database 106, in any technically feasible combination. Any one or more of 3D production assets, annotation media, and annotation metadata could be streamed between client device 108 and any one or more of the servers in the cloud environment, media content server 104, and production database 106. In this manner, the techniques described herein are not limited to the processing and storage resources of client device 108.

In yet another example, the disclosed techniques are described in the context of automatically generating a customized GUI for automatically displaying and providing electronic feedback about 3D production assets associated with a media production. Additionally or alternatively, the techniques described herein may be further employed to automatically generate a customized GUI for automatically displaying and providing electronic feedback about 2D pre-production assets associated with such a media production. In yet another example, any one or more portions of the system 100 could be integrated with existing project management, communication, and productivity tools. Such project management, communication, and productivity tools could include, without limitation, video conference review systems, production management systems, ticket or bug tracking systems, and task list management applications.

Various techniques for creative review of production assets in a media production system are now described in further detail.

Creative Review System for Annotating Production Assets

As further described herein, system 100 provides a mechanism for creative review and annotation of 3D production assets associated with a media production. Via system 100, an artist directly exports 3D production assets in the form of asset data bundles, along with additional information in the form of asset metadata, that are employed to automatically generate a customized GUI. Based on data included in the asset data bundle and/or asset metadata for a particular production asset, client device 108 automatically generates a customized GUI and displays the customized GUI on a display device. The customized GUI facilitates receiving electronic feedback about the production assets and distributing that feedback to other machines, such as artist development workstation 102, media content server 104, production database 106. The electronic feedback received via the customized GUI is referred to herein as annotation inputs or, more simply, inputs. The annotation inputs are stored as annotation media and/or annotation metadata that is published by transmitting the annotation media and/or annotation metadata to other machines, such as artist development workstation 102, media content server 104, production database 106.

As a result, stakeholders are able to review production assets earlier and with greater fidelity and resolution relative to prior approaches. Further, 3D production assets may be rendered in parallel with other 3D production assets even in early production phases, thereby enabling creative review of character modeling in the context of shading, shading in the context of lighting, lighting in the context of camera effects, and so on. Various aspects of system 100 are now described in further detail.

Figure 2:
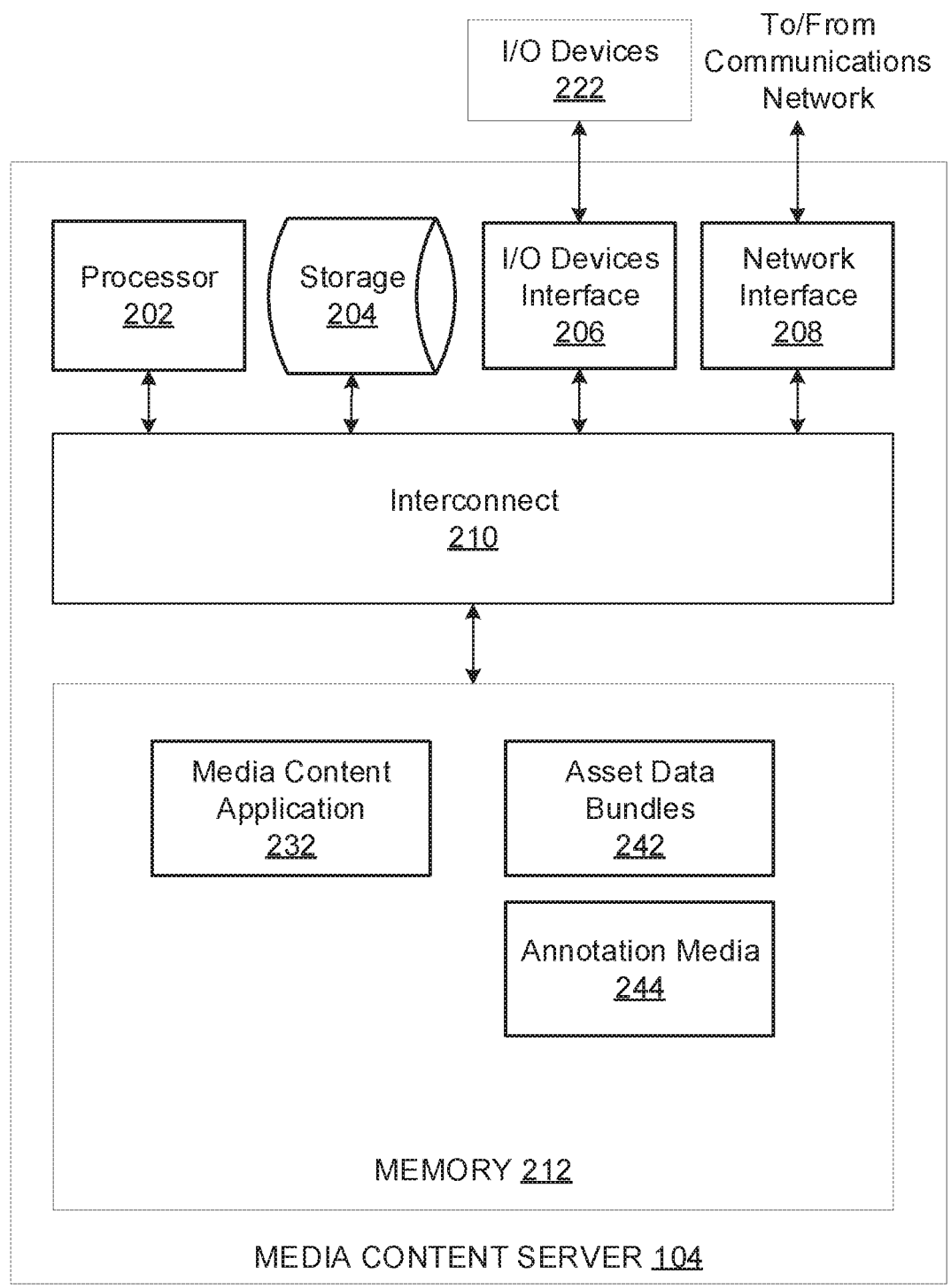
FIG. 2 is a more detailed illustration of the media content server of FIG. 1, according to various embodiments of the present invention.

FIG. 2 is a more detailed illustration of the media content server 104 of FIG. 1, according to various embodiments of the present invention. As shown, media content server 104 includes, without limitation, a processor 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals. The display device may be included in a VR/AR headset. Further, the display device may project an image onto one or more surfaces, such as walls or projection screens.

Processor 202 is included to be representative of a single central processing unit (CPU), multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a media content application 232, asset data bundles 242, and annotation media 244. The media content application 232, when executed by the processor 202, performs one or more operations associated with the media content server 104 of FIG. 1, as further described herein.

In operation, media content application 232 receives published 3D production assets in the form of asset data bundles from artist development workstation 102. Media content application 232 stores the received asset data bundles in asset data bundles 242. Upon receiving an asset request from computing device 108, media content application 232 transmits the requested asset data bundle to client device 108 for creative review. Subsequently, after creative review is complete, media content application 232 receives annotation media from client device 108. Media content application 232 stores the received annotation media in annotation media 244. Upon receiving a request for the annotation media 244 from artist development workstation 102, media content application 232 transmits the requested asset data bundle to artist development workstation 102 for appropriate processing.

Figure 3:
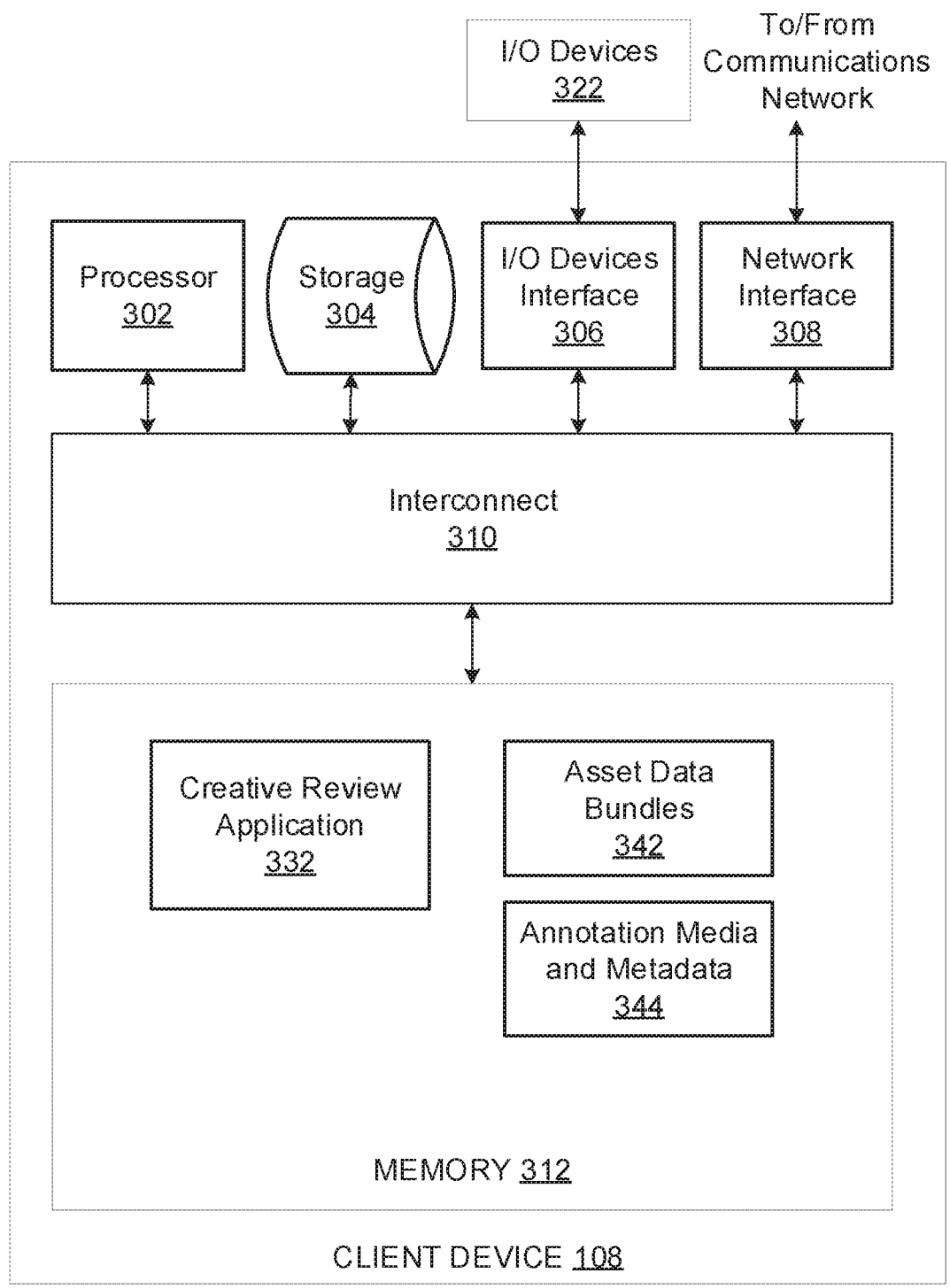
FIG. 3 is a more detailed illustration of the client device of FIG. 1, according to various embodiments of the present invention.

FIG. 3 is a more detailed illustration of the client device 108 of FIG. 1, according to various embodiments of the present invention. As shown, client device 108 includes, without limitation, a central processing unit (CPU) 302, a storage 304, an input/output (I/O) devices interface 306, a network interface 308, an interconnect 310, and a system memory 312. Processor 302, storage 304, input/output (I/O) devices interface 306, network interface 308, interconnect 310, and system memory 312 operate substantially the same as the corresponding elements described in conjunction with FIG. 2, except as further described below.

The processor 302 retrieves and executes programming instructions stored in the system memory 312. Similarly, the processor 302 stores and retrieves application data residing in the system memory 312. The interconnect 310 facilitates transmission, such as of programming instructions and application data, between the processor 302, input/output (I/O) devices interface 306, storage 304, network interface 308, and system memory 312. The I/O devices interface 306 is configured to receive input data from user I/O devices 322. Examples of user I/O devices 322 may include one of more buttons, a keyboard, and a mouse or other pointing device. The I/O devices interface 306 may also include an audio output unit configured to generate an electrical audio output signal, and user I/O devices 322 may further include a speaker configured to generate an acoustic output in response to the electrical audio output signal. Another example of a user I/O device 322 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 302 is included to be representative of a single CPU, multiple CPUs, a single CPU having multiple processing cores, and the like. And the system memory 312 is generally included to be representative of a random access memory. The storage 304 may be a disk drive storage device. Although shown as a single unit, the storage 304 may be a combination of fixed and/or removable storage devices, such as fixed disc drives, floppy disc drives, tape drives, removable memory cards, or optical storage, network attached storage (NAS), or a storage area-network (SAN). Processor 302 communicates to other computing devices and systems via network interface 308, where network interface 308 is configured to transmit and receive data via a communications network.

In some embodiments, client device 108 may operate in the context of a virtual reality (VR) or augmented reality (AR) environment. In such embodiments, client device may communicate with a VR/AR headset (not explicitly shown) or similar device. Such a VR/AR headset may include, without limitation, a computing device that may be a personal computer, video game console, personal digital assistant, mobile phone, mobile device, or any other device suitable for implementing one or more aspects of the present invention. VR/AR headset may communicate directly with client device 108. Additionally or alternatively, VR/AR headset may communicate with client device 108 over any technically feasible wired or wireless communications protocol over a communications network, such as communications network 120. VR/AR headset may communicate with client device 108 via any technically feasible communication channel, including, without limitation, point-to-point communications channels, one or more LANs, and one or more internet-based WANs. Via such a communications link, VR/AR headset may perform any one or more functions described in conjunction with client device 108, as further described herein.

The system memory 312 includes, without limitation, a creative review application 332, asset data bundles 342, and annotation media and metadata 344. The creative review application 332, when executed by the processor 302, performs one or more operations associated with client device 108 of FIG. 1, as further described herein.

In operation, creative review application 332 receives notification, via artist development workstation 102, that a new production asset is available for creative review. Upon receiving the notification, creative review application 332 requests access to the new production asset. In response, creative review application 332 receives a corresponding asset data bundle and asset metadata from media content server 104 and production database 106, respectively. Based on the data included in one or both of the asset data bundle and asset metadata, creative review application 332 automatically generates a customized GUI and displays the customized GUI on a display device. The customized GUI facilitates receiving electronic feedback about the production assets and distributing that feedback to other machines, such as artist development workstation 102, media content server 104, production database 106. Upon completion of creative review, creative review application 332 publishes annotation media by transmitting the annotation media to media content application 232 executing on media content server 104. Further, creative review application 332 publishes annotation metadata by transmitting the annotation metadata to production database 106.

In some embodiments, the asset data bundles may include a software application extension or executable program. Such software application extensions or executable programs may be generated by the artist development workstation 102 at the time of publishing the corresponding asset data bundle. By generating a customized GUI, stakeholders and other reviewers view only a subset of the full set of tools and features available to the artist. As a result, the stakeholders and other reviewers do not need extensive expertise or training to perform creative review of 3D production assets. Further, the application extension, executable program, and/or other information for generating the customized GUI may be downloaded once, when a new 3D production asset is initially reviewed. As a result, during subsequent review and annotation iterations, only the revised 3D production asset may be downloaded without downloading the application extension, executable program, and/or other information again.

In general, the tools and features available to a stakeholder when using creative review application 332 are a subset of the full set of available tools and are customized to the type of review, the type of production asset, and the particular stakeholder. Therefore, a stakeholder may be constrained to simple adjustments of a camera or light source, without having full access to the tools and features available to the artist. In one example, a stakeholder reviewing a scene layout could have only the ability to move one or more virtual cameras in a 3D environment. In another example, a stakeholder reviewing a lighting design could have basic controls for adjusting light sources. Certain stakeholders could have access to tools and features across multiple disciplines for creative review of multiple aspects of 3D production assets. Via creative review application 332, a stakeholder may move within the 3D environment to view 3D production assets from various viewpoints.

In some embodiments, creative review application 332 may generate a customized GUI based on the type 3D production asset being published. If the 3D production asset being published includes an animation, then creative review application 332 may generate a customized GUI that includes a timeline that may be scrubbed backwards and forwards in time. If, on the other hand, the 3D production asset being published does not include an animation, then creative review application 332 may generate a customized GUI that provides for navigation and viewing of the 3D production element from various angles but does not include a timeline.

In some embodiments, creative review application 332 may generate a customized GUI based on the discipline of the artist who is publishing the 3D production asset. If the publisher is a lighting production designer, then creative review application 332 may generate a GUI that includes lighting tools and features for creative review by the lead lighter or the cinematographer. Similarly, if the publisher is a set designer, then creative review application 332 may generate a GUI that includes tools and features specific to creative review by the set design manager.

In some embodiments, creative review application 332 may generate a different GUI based on the department to which the reviewing stakeholder belongs. Therefore, creative review application 332 may generate a different GUI for stakeholders in the lighting department, the animation department, the modeling department, and the rigging department. Certain tools and features that are common to all disciplines may be available in multiple versions of the GUI. In addition, the director and/or other high-ranking members of the production team may have access to a GUI with more comprehensive set of tools and features across multiple production disciplines and departments. Further, certain stakeholders who provide review and approval, but do not need to manipulate the 3D production assets, may have access to a GUI that has annotation tools and features without any manipulation tools and features.

In general, creative review application 332 generates a customized GUI based on any technically feasible combination of the discipline of the artist who published the 3D production asset, the type of 3D production asset, an application extension or executable program associated with the 3D production asset, and the department or discipline of the stakeholder responsible for creative review. Logic within creative review application 332 may take any or all of these aspects into account to customize the GUI for the reviewing stakeholder.

Figure 4A:
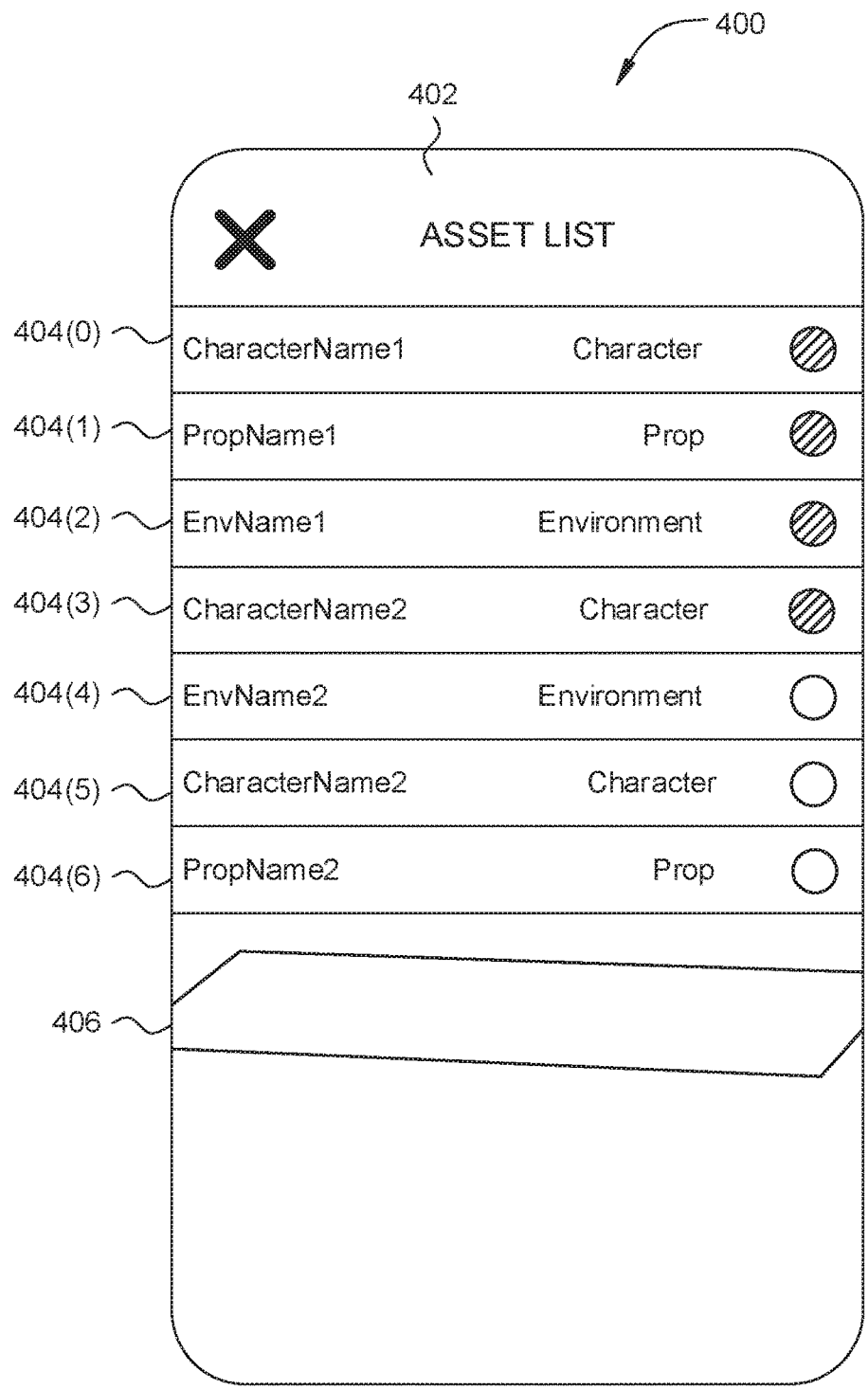
FIGS. 4A-4K illustrate an exemplar graphical user interface (GUI) that can be used to review and annotate a production asset via the client device of FIG. 1, according to various embodiments of the present invention.

FIGS. 4A-4K illustrate an exemplar graphical user interface (GUI) that can be used to review and annotate a production asset via the client device 108 of FIG. 1, according to various embodiments of the present invention. In some embodiments, FIGS. 4A-4K may be associated with review and annotation of a production asset in a VR or AR environment. In such embodiments, the GUI illustrated in FIGS. 4A-4K may be viewable via a VR/AR headset associated with client device 108. As shown in FIG. 4A, GUI 400 includes an asset list 402 of the production assets included in the asset data bundle. These production assets include various production items 404(0)-404(6). Production items 404(0)-404(3) include an icon filled with a crosshatched pattern, indicating that these production items 404(0)-404(3) are submitted for review and have not yet been reviewed. By contrast, production items 404(4)-404(6) include an icon without a crosshatched pattern, indicating that these production items 404(4)-404(6) are either not submitted for review or have already been reviewed. The asset title, asset category, and review status of each of production items 404(0)-404(6) are based on annotation metadata encoded in the asset data bundle and/or the associated asset metadata. Further, GUI 400 includes a virtual platform 406 that provides a reference point for annotating production assets. In some embodiments, FIGS. 4A-4K may represent a GUI associated with an AR environment. In such embodiments, the platform may be a physical object in a room, such as a table or the floor, rather than a virtual platform 406. Selecting one of the production items 404(0)-404(3) that is subject to review causes an annotation GUI to be displayed automatically, as now described.

Figure 4B:
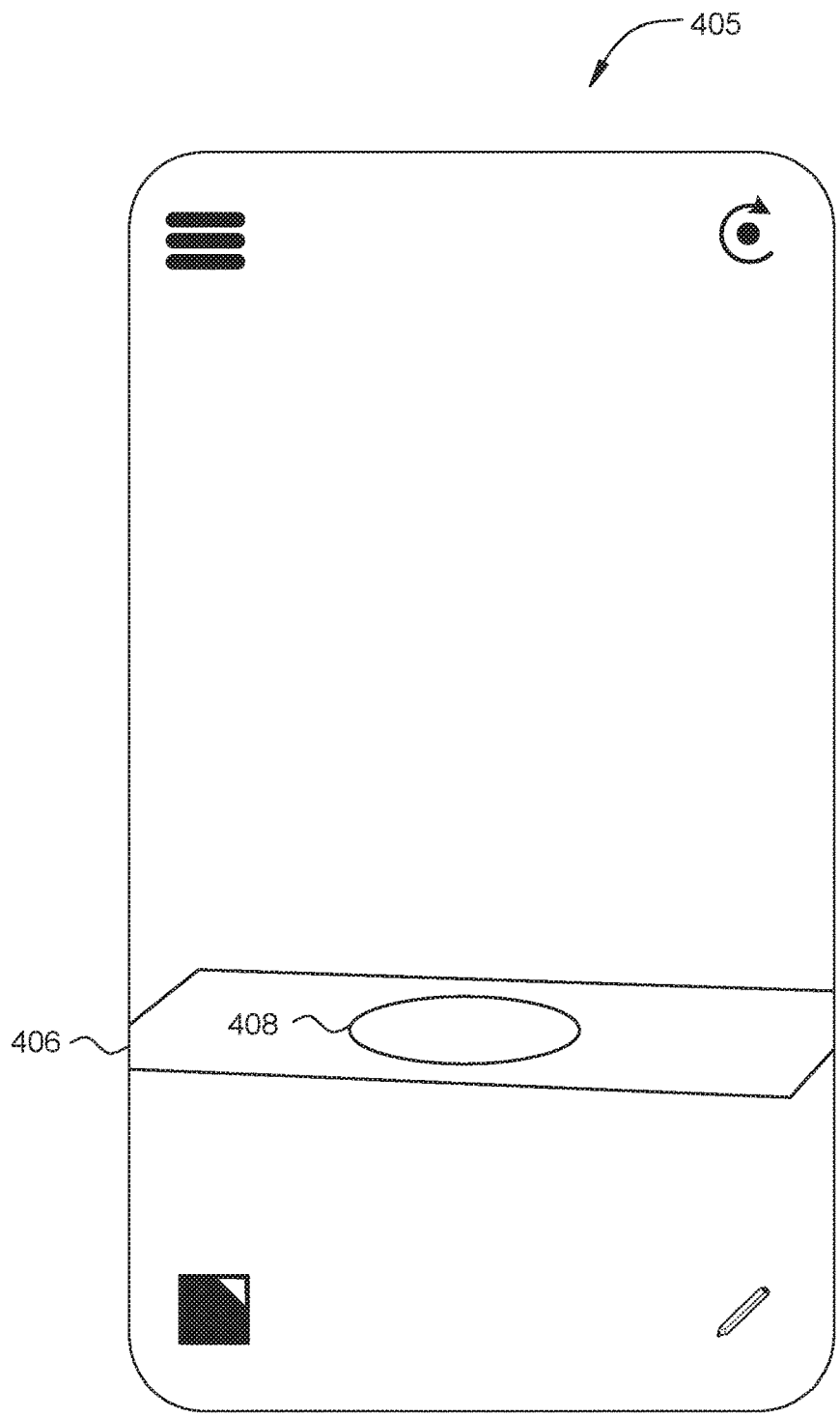
Figure 4C:
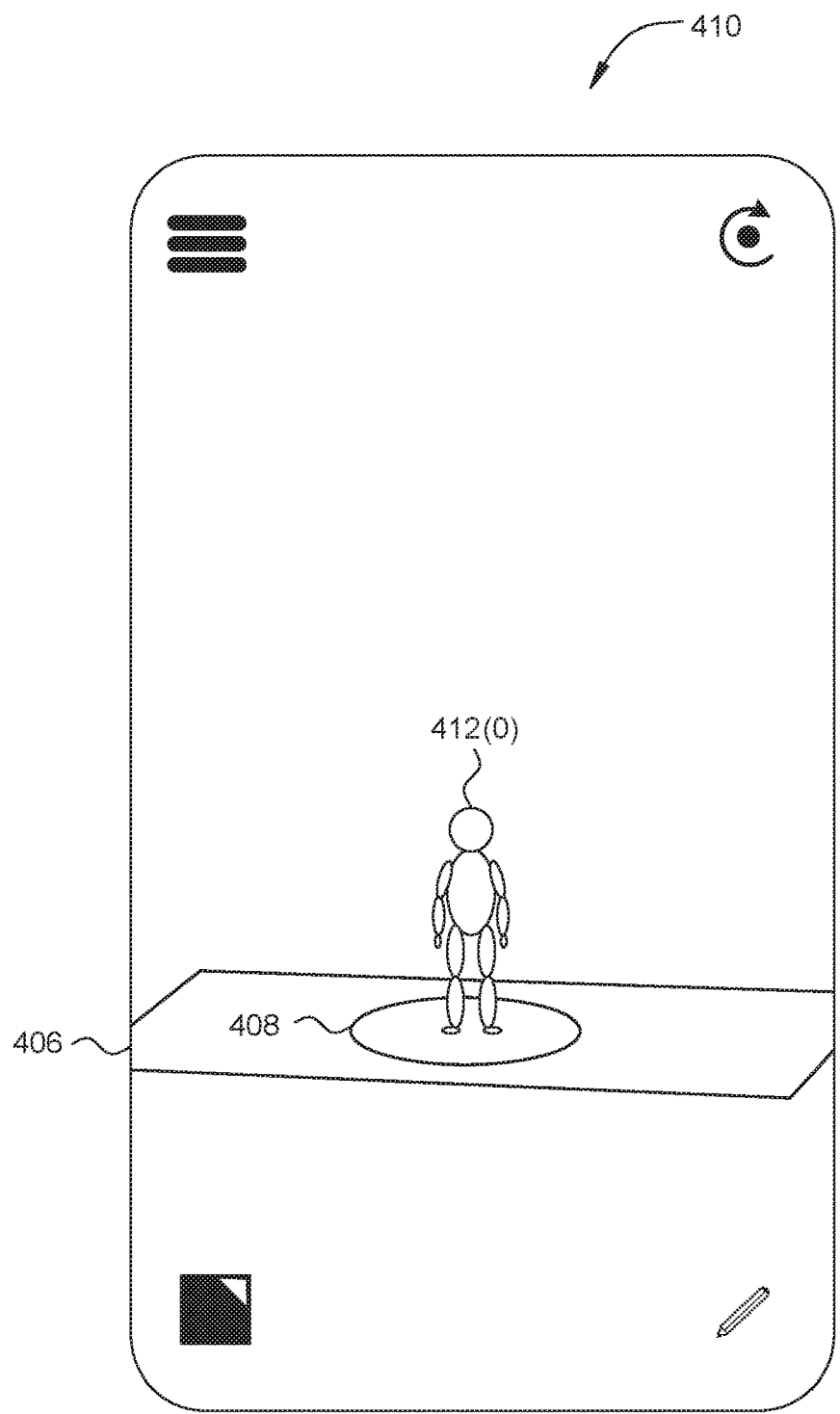
Figure 4D:
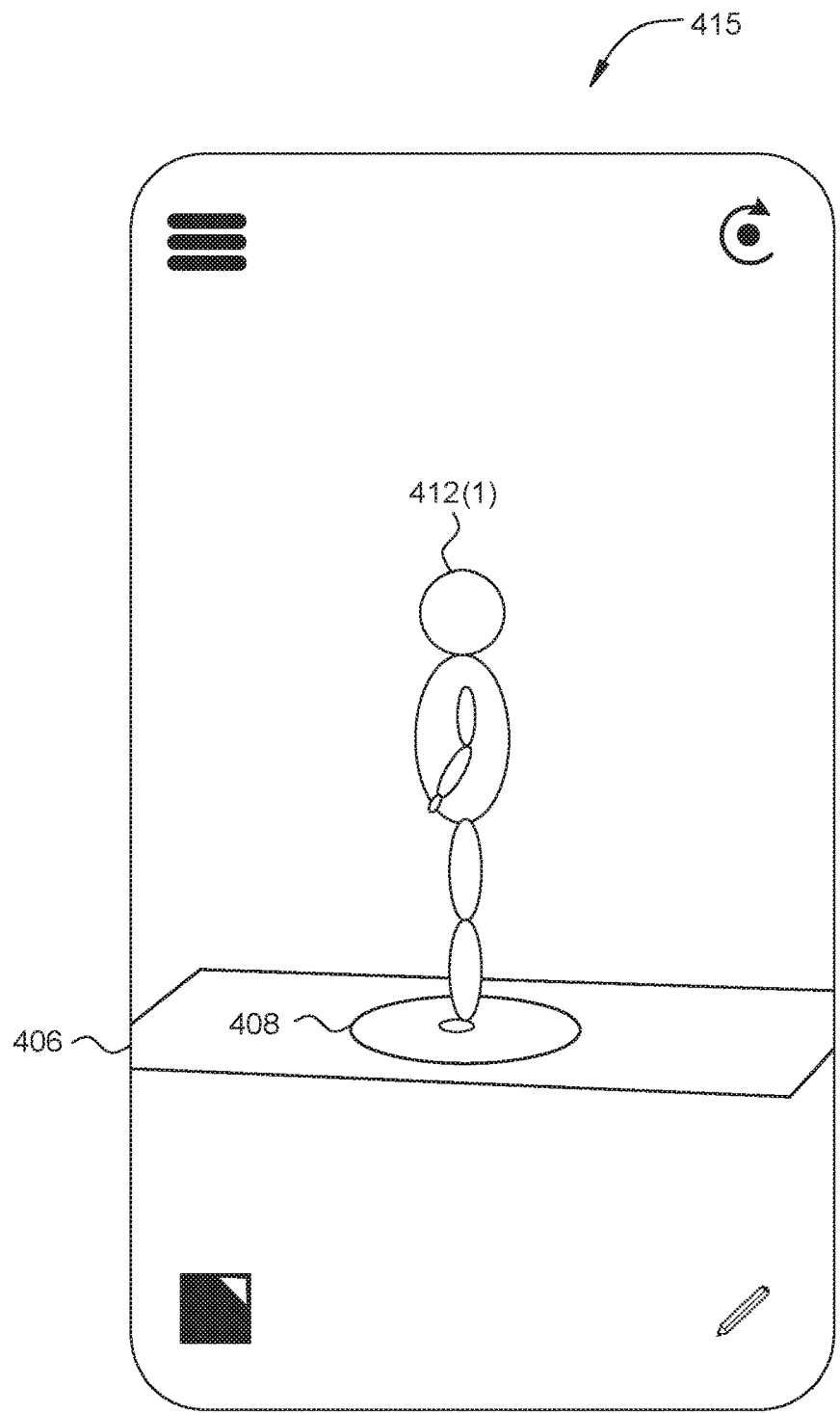

As shown in FIG. 4B, GUI 405 includes the virtual platform 406. Via one or more I/O devices 322 associated with client device 108, a stakeholder defines a review area for an annotation process by selecting a virtual pedestal 408 on virtual platform 406. After receiving the selection of the virtual pedestal 408, GUI 410 is displayed. As shown in FIG. 4C, GUI 410 includes virtual platform 406 and virtual pedestal 408. GUI 410 further includes a review object 412(0). Review object 412(0) is selected and displayed based on the location of the virtual pedestal 408 in 3D space. As shown in FIG. 4D, GUI 415 includes virtual platform 406 and virtual pedestal 408. Review object 412(1) has been rotated to a different angle in order to view review object 412(1) from a different angle. Review object 412(1) may be positioned, rotated, and/or scaled via any technical feasible technique and via any technically feasible I/O device 322. For example, review object 412(1) could be moved or rotated via a swipe motion on a touchscreen I/O device 322. Additionally or alternatively, review object 412(1) could be scaled up or down via a pinch out or pinch in motion on a touchscreen-based I/O device 322.

Figure 4E:
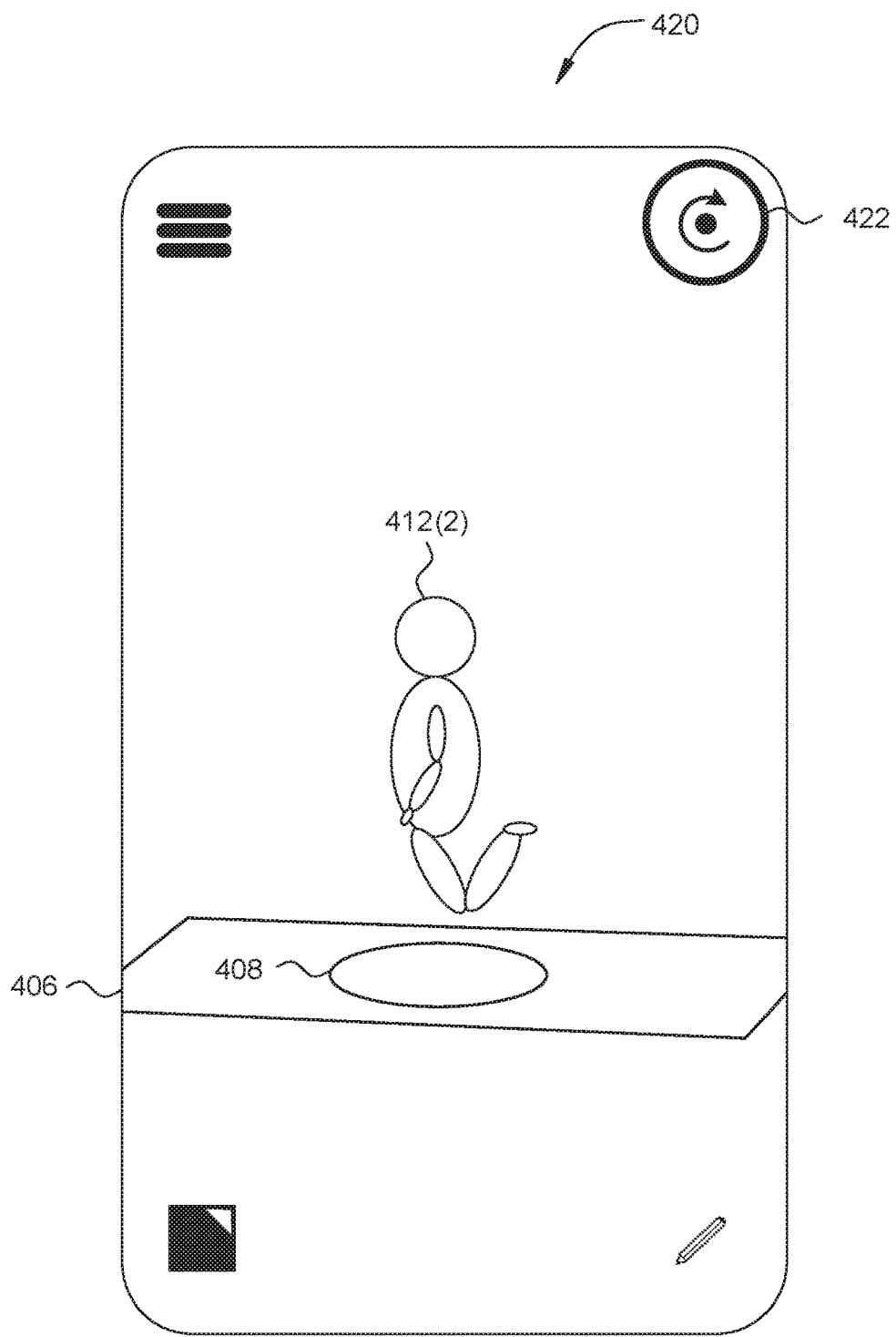

As shown in FIG. 4E, GUI 420 includes virtual platform 406 and virtual pedestal 408. GUI 420 further includes a free-look graphical control 422. If the free-look graphical control 422 is selected, then review object 412(2) becomes untethered from virtual pedestal 408. In this manner, the base of review object 412(2) is freed from virtual pedestal 408, and review object 412(2) may be moved and/or rotated in any direction. In this manner, the pitch, roll, and/or yaw of review object 412(2) may be modified independent of virtual pedestal 408. If the free-look graphical control 422 is selected again, then untethered review object 412(2) becomes tethered to virtual pedestal 408 again.

Figure 4F:
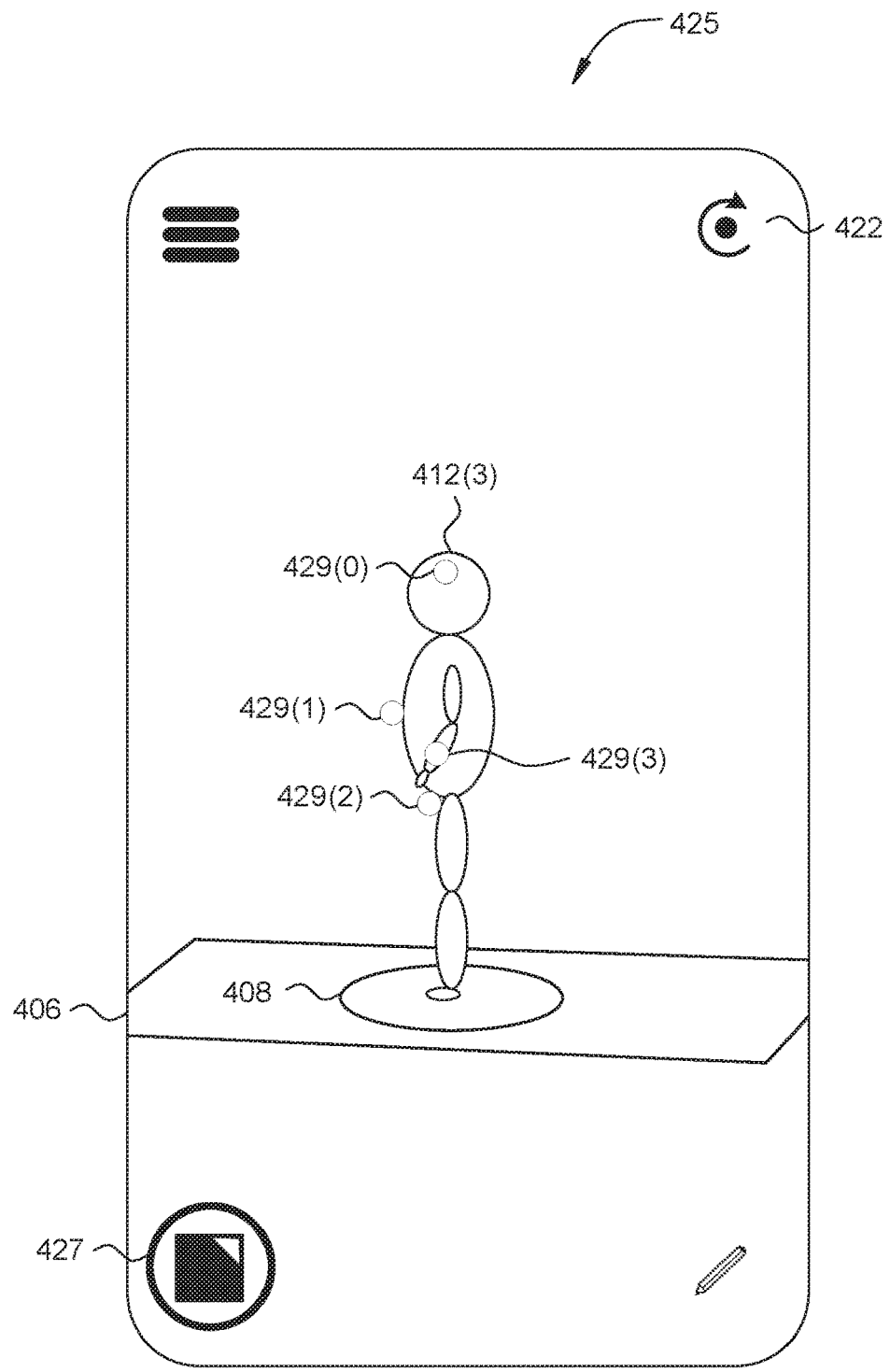

As shown in FIG. 4F, GUI 425 includes virtual platform 406, virtual pedestal 408, and free-look graphical control 422. GUI 425 further includes a show/hide notes graphical control 427. If the show/hide notes graphical control 427 is selected, then GUI 425 displays hotspots 429(0)-429(3) associated with various notes related to review object 412 (3). Each hotspot 429(0)-429(3) could be displayed with a crosshatch pattern, color, or other indication related to the status of the corresponding note. For example, hotspot 429(0) could be encoded to indicate that the hotspot 429(0) has already been annotated by a stakeholder or other creative reviewer. Hotspot 429(1) could be encoded to indicate that the note related to hotspot 429(1) has been resolved. Hotspots 429(2)-429(3) could be encoded to indicate that the notes related to hotspots 429(2)-429(3) have not yet been resolved. By selecting various hotspots 429(0)-429(3), a stakeholder or other creative reviewer could view various notes entered by the artist for review, as well as notes entered by the stakeholder or other creative reviewer for the artist.

Figure 4G:
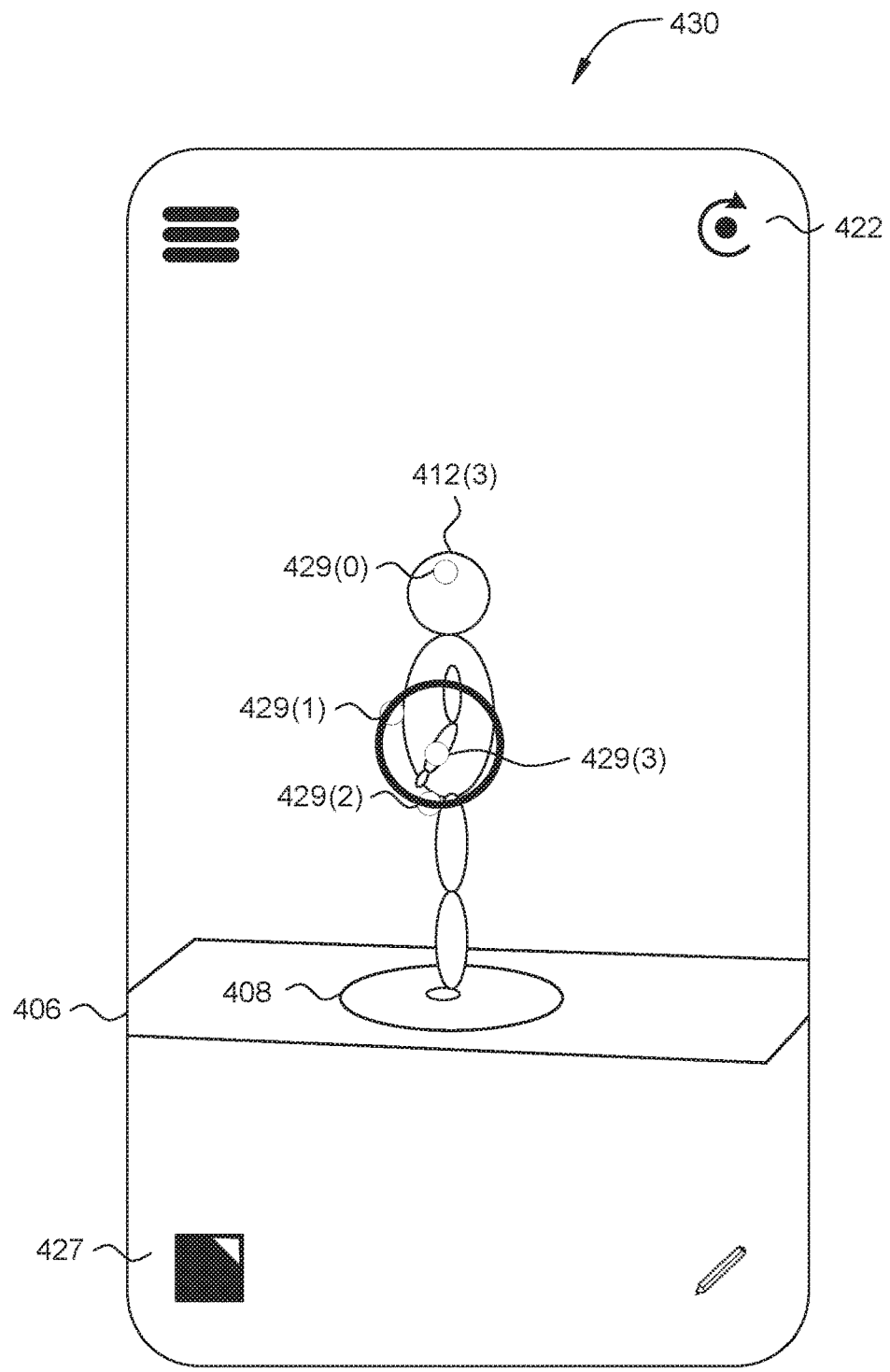

As shown in FIG. 4G, GUI 430 includes virtual platform 406, virtual pedestal 408, free-look graphical control 422, and show/hide notes graphical control 427. The stakeholder or other creative reviewer selects hotspot 429(3). In response, hotspot 429(3) expands to indicate that hotspot 429(3) has been selected. Once selected, the stakeholder or other creative reviewer could open, view, and edit the note corresponding to hotspot 429(3).

Figure 4H:
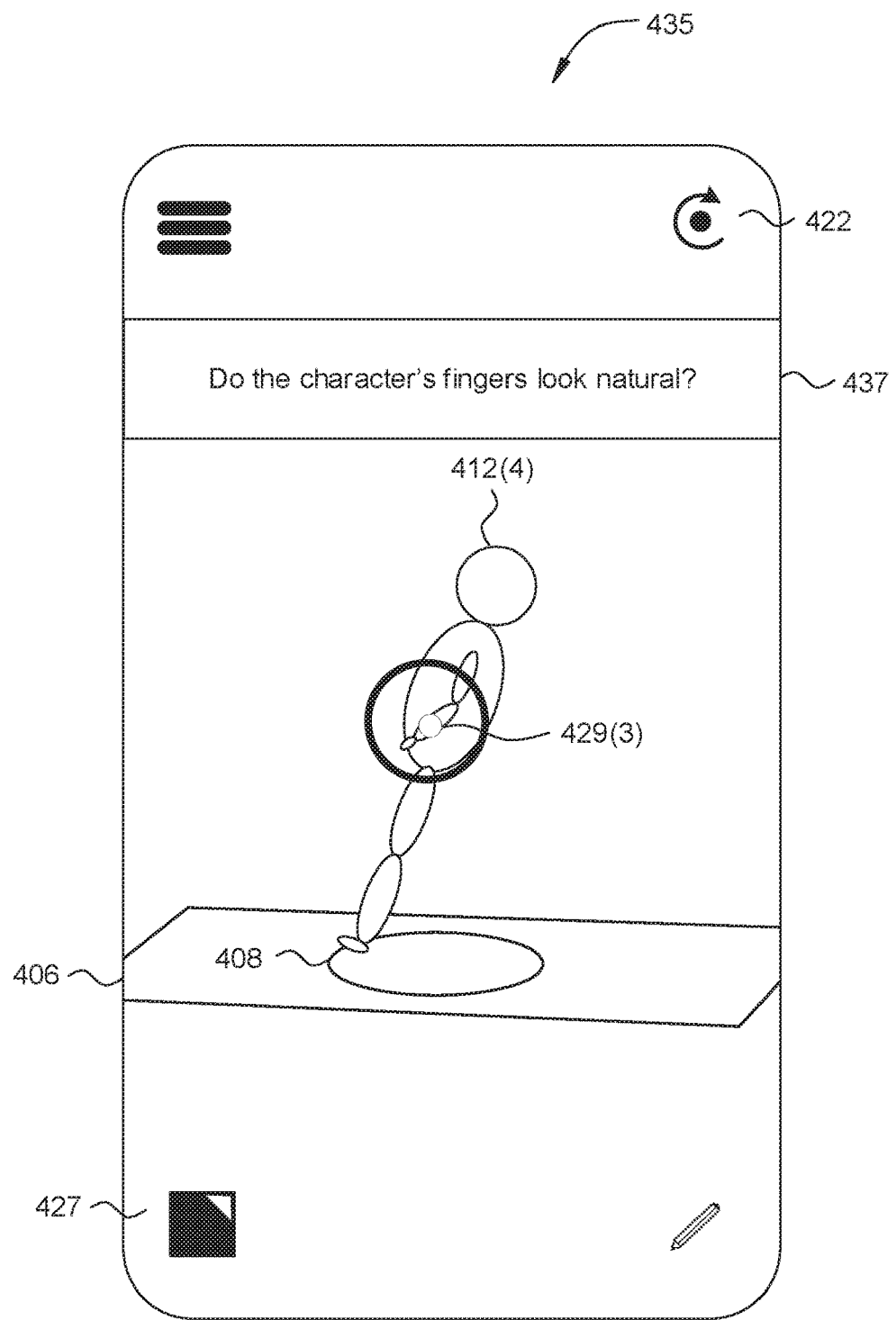

As shown in FIG. 4H, GUI 435 includes virtual platform 406, virtual pedestal 408, free-look graphical control 422, and show/hide notes graphical control 427. The stakeholder or other creative reviewer has selected the note 437 corresponding to hotspot 429(3). In response, review object 412(4) has been repositioned to a new position and/or orientation based on the note 437 corresponding to hotspot 429(3). Further, GUI 435 displays the contents of note 437. As shown in FIG. 4H, note 437 includes a question from the artist as to whether the fingers of the character represented by review object 412(4) look natural at the displayed position and/or orientation. In response, the stakeholder or other creative reviewer selects note 437 to enter a responsive note.

Figure 4I:
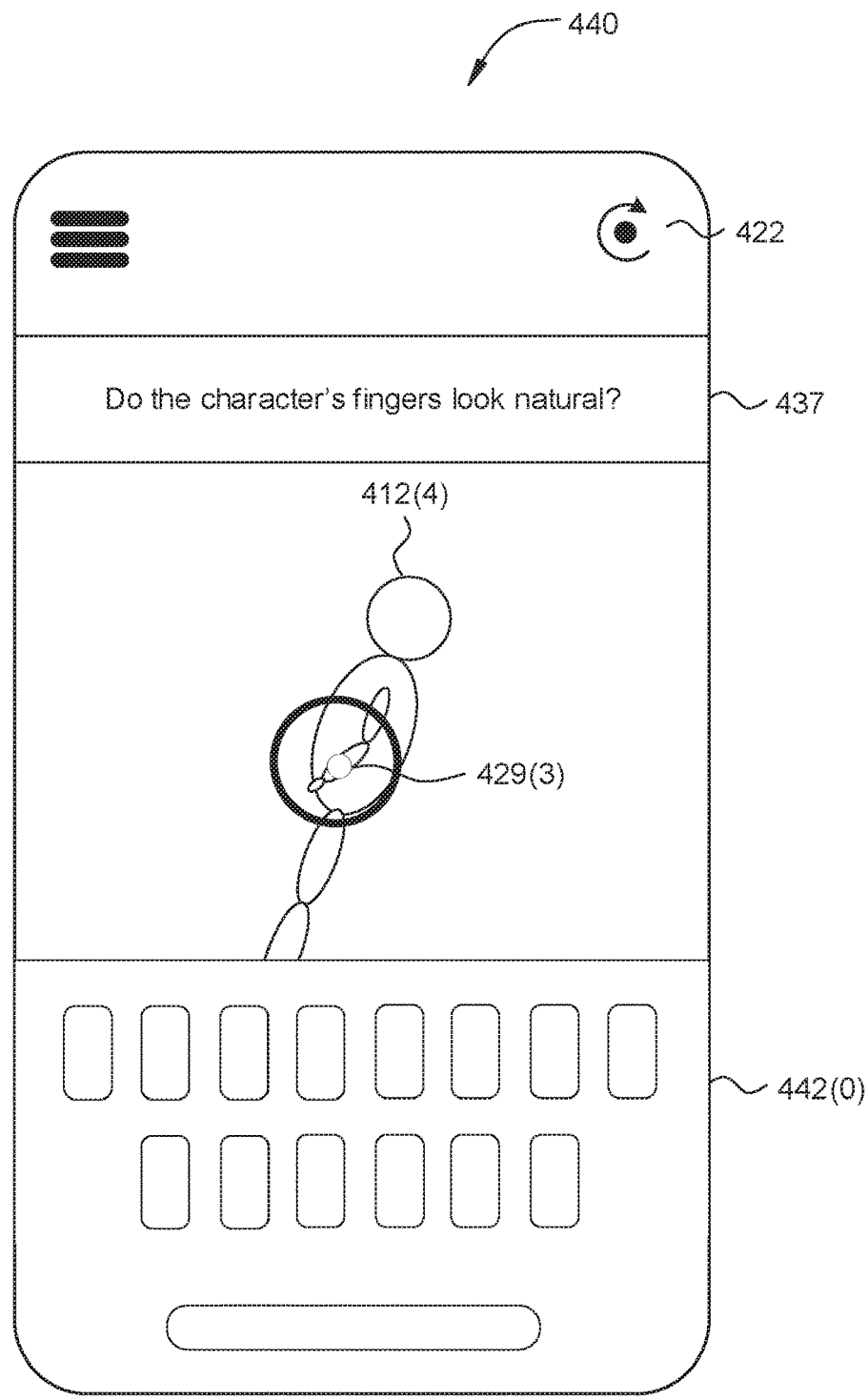

As shown in FIG. 4I, GUI 440 includes review object 412(4), hotspot 429(3), and note 437. The stakeholder or other creative reviewer has selected the note 437 in order to enter a responsive note. As a result, GUI 440 includes a keyboard region 442(0) by which the stakeholder or other creative reviewer may enter the responsive note. After the stakeholder or other creative reviewer has entered the responsive note, the crosshatch pattern, color, and/or other characteristic of hotspot 429(3) changes to reflect that the responsive note has been entered. In addition to responsive notes, new notes may be entered by the stakeholder or other creative reviewer.

Figure 4J:
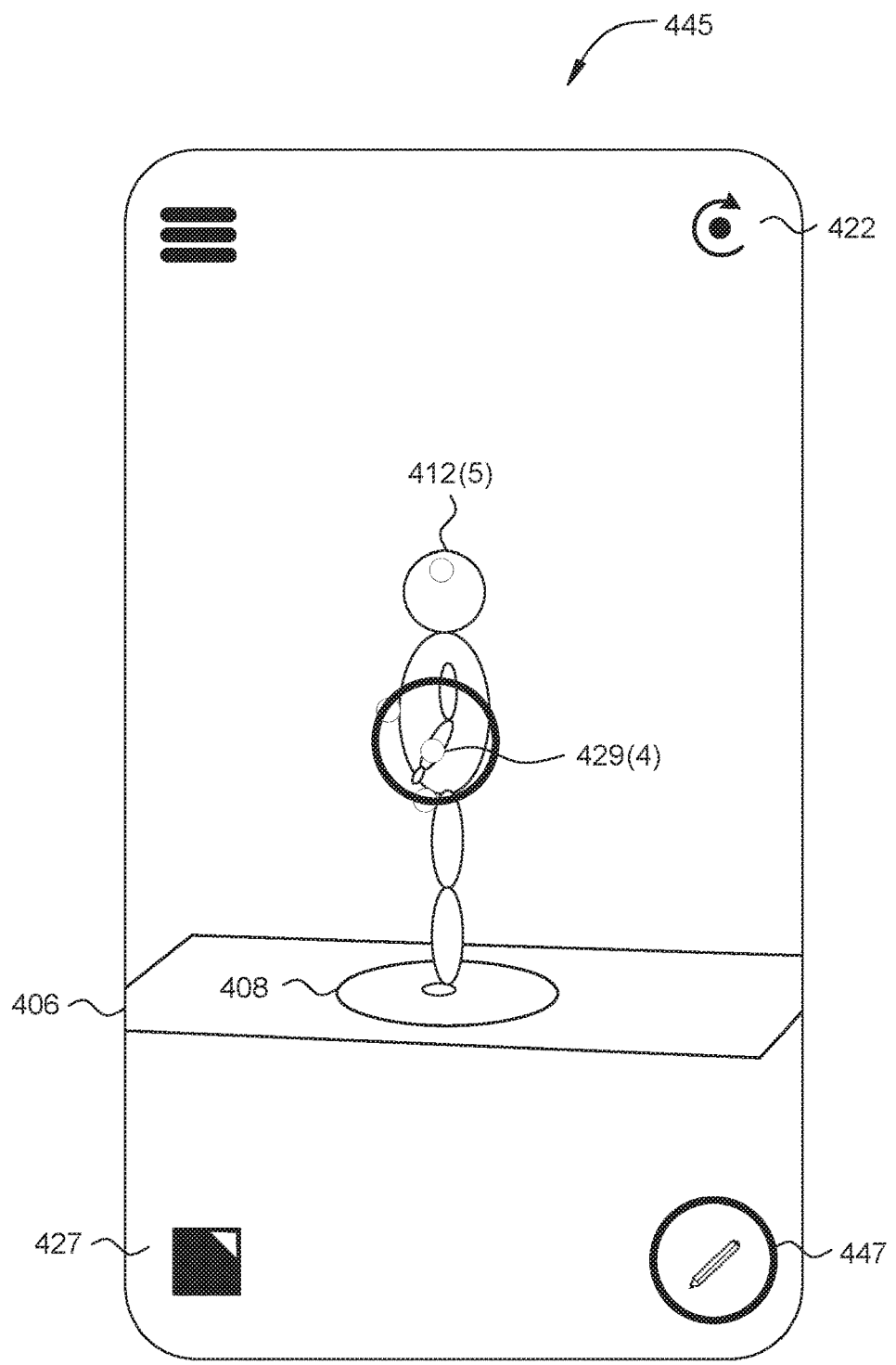

As shown in FIG. 4J, GUI 445 includes virtual platform 406, virtual pedestal 408, free-look graphical control 422, and show/hide notes graphical control 427. GUI 445 further includes a new note graphical control 447. The stakeholder or other creative reviewer has selected has selected the new note graphical control 447 and subsequently selected a new hotspot 429(4) on review object 412(5) in order to enter a new note. In response, the current orientation of review object 412(5) is associated with the new note associated with hotspot 429(4). As a result, when the artist later selects hotspot 429(4), review object 412(5) repositions to the current location and orientation shown in GUI 445.

Figure 4K:
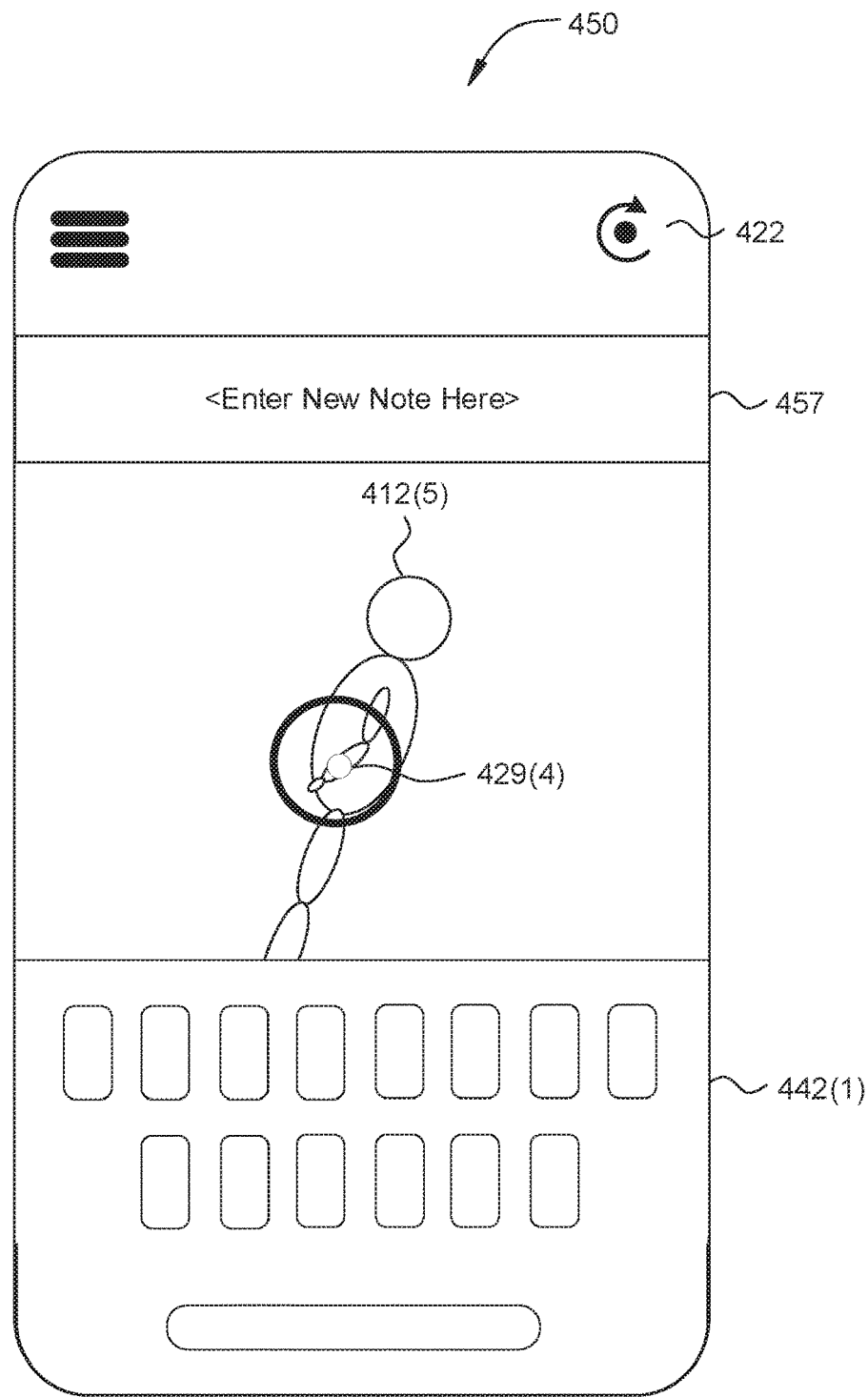

As shown in FIG. 4K, GUI 450 includes free-look graphical control 422, new hotspot 429(4), and review object 412(5). GUI 445 further includes a keyboard region 442(1) by which the stakeholder or other creative reviewer may enter the new note 457 corresponding to the new hotspot 429(4).

Figure 5:
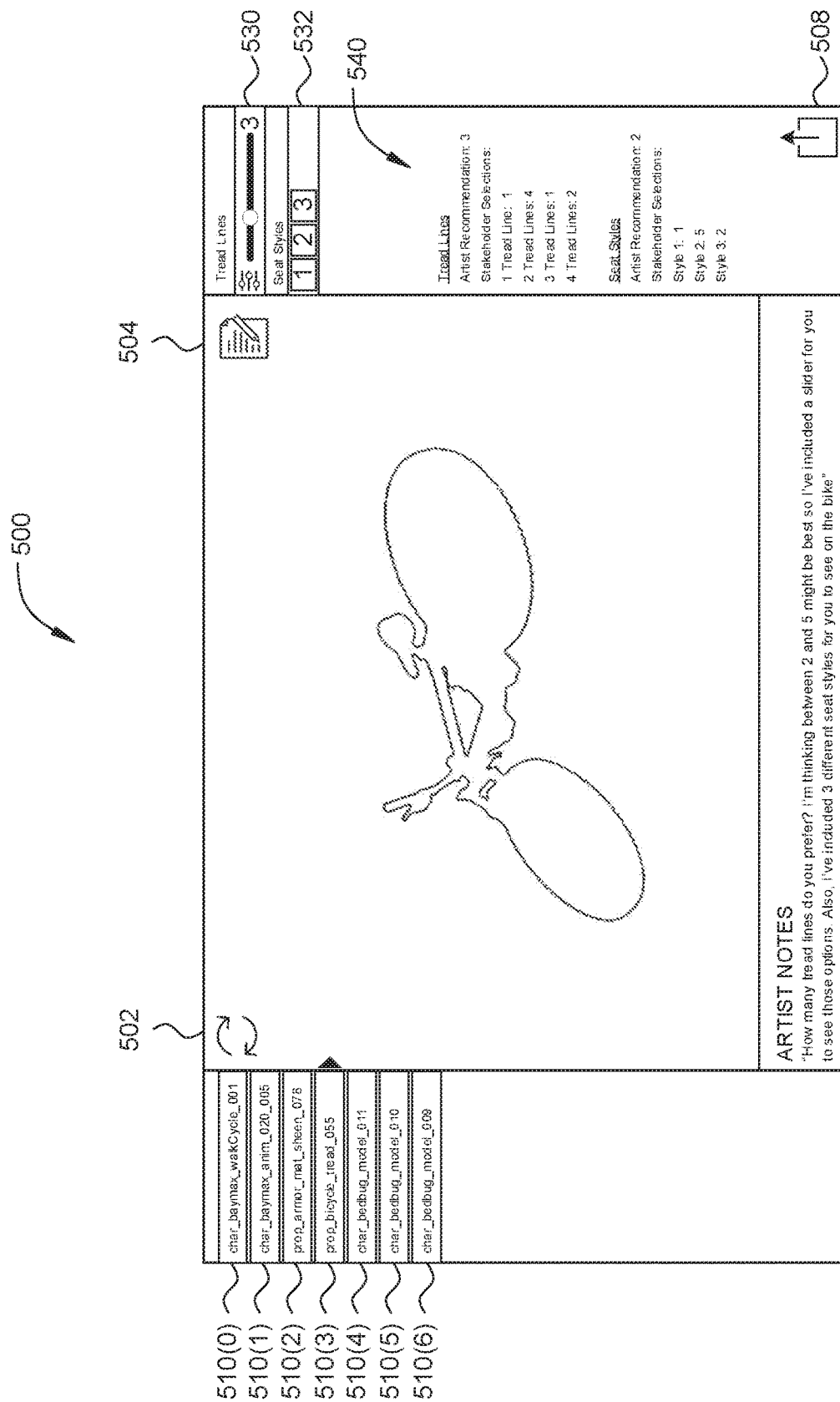
FIG. 5 illustrates an exemplar GUI that can be used to review a production asset via the client device of FIG. 1, according to various embodiments of the present invention.

FIG. 5 illustrates an exemplar GUI 500 that can be used to review a production asset via the client device of FIG. 1, according to various embodiments of the present invention. As shown, a list of assets 510(0)-510(6) available on media content server 104 are displayed on the GUI 500. Asset 510(3), labeled prop_biycle_tread_055, is selected. As a result, the 3D model associated with asset 510(3) is displayed on GUI 500. Notes area 506 illustrates specific issues for which the artist is requesting review. In particular, notes area 506 indicates that the artist is requesting feedback on the number of tread lines to show, along with a selection of seat styles.

Tread lines graphical control 530 provides a mechanism for the stakeholder to modify the number of tread lines and view the modified version of asset 510(3) on GUI 500. Similarly, seat styles graphical control 532 provides a mechanism for the stakeholder to change the seat style and view the modified version of asset 510(3) on GUI 500. To view the modified version of asset 510(3), the stakeholder selects content refresh graphical control 502. Further, the stakeholder may enter one or more annotations by selecting annotation graphical control 504. After completing modifications and/or annotations, the stakeholder saves the modifications and/or annotations by selecting the submit review graphical control 508. Client review application 332 then publishes annotation media and annotation metadata associated with the modifications and/or annotations, as further described herein.

Feedback area 540 displays artist recommendations, if any, and feedback from other stakeholders regarding the 3D production asset displayed on GUI 500. As shown, feedback area 540 indicates that the bicycle included in the 3D production asset should have three (3) thread lines and should have seat style two (2). With regard to the number of tread lines, the number of stakeholders who prefer one, two, three, and four tread lines are one, four, one, and two stakeholders, respectively. With regard to the seat style, the number of stakeholders who prefer seat style one, two, and three are one, five, and two stakeholders, respectively. Via the feedback area 540, stakeholders are able to review the preferences of the artist and other stakeholders. In this manner, stakeholders may review the various options and preferences and, thereby, reach a consensus. When the stakeholders reach an agreement with respect to the various options under review, the stakeholders are able to provide unified feedback and approval for these options. The artist then reviews the feedback and approval, by reviewing the appropriate annotation media and/or annotation metadata, and then revises the 3D production asset accordingly.

Figure 6:
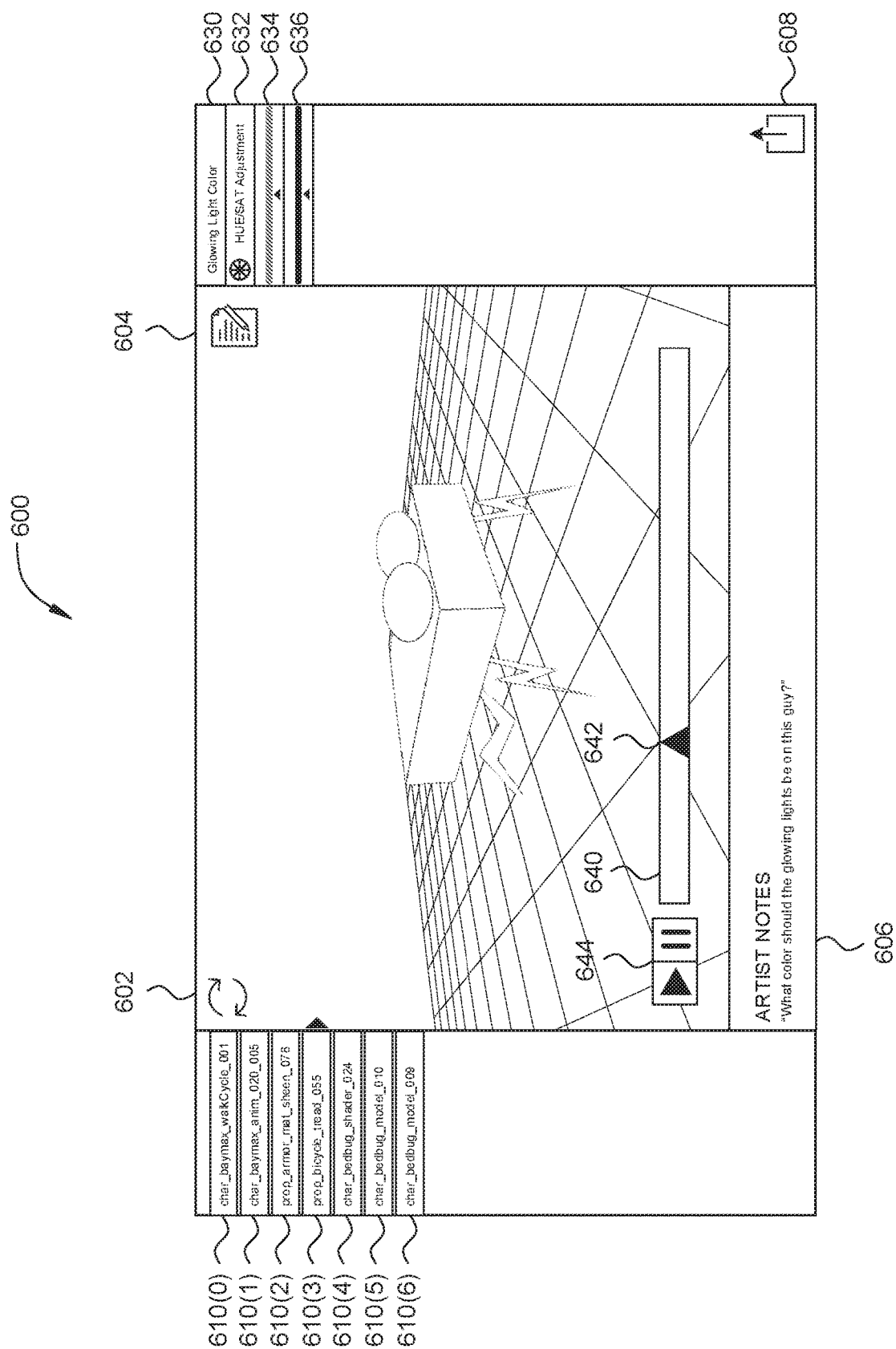
FIG. 6 illustrates another exemplar GUI that can be used to review a production asset via the client device of FIG. 1, according to various other embodiments of the present invention.

FIG. 6 illustrates another exemplar GUI 600 that can be used to review a production asset via the client device of FIG. 1, according to various other embodiments of the present invention. As shown, a list of assets 610(0)-610(6) available on media content server 104 are displayed on the GUI 600. Asset 610(4), labeled char_bedbug_shader_024, is selected. As a result, the 3D model associated with asset 610(4) is displayed on GUI 600. Notes area 606 illustrates specific issues for which the artist is requesting review. In particular, notes area 606 indicates that the artist is requesting feedback on the color of the glowing lights on asset 610(4).

Glowing light color graphical control 630 provides a mechanism for the stakeholder to modify various aspects of the glowing lights and view the modified version of asset 610(4) on GUI 600. In particular, hue/sat graphical control 632 includes a hue adjustment graphical control 634 and a saturation graphical control 636 for modifying the glowing lights of asset 610(4). To view the modified version of asset 610(4), the stakeholder selects content refresh graphical control 602. Further, the stakeholder may enter one or more annotations by selecting annotation graphical control 604. After completing modifications and/or annotations, the stakeholder saves the modifications and/or annotations by selecting the submit review graphical control 608. Client review application 332 then publishes annotation media and annotation metadata associated with the modifications and/or annotations, as further described herein.

Timeline graphical control 640 indicates a range of time for an animation sequence associated with asset 610(4), as displayed on GUI 600. The range of time is represented by timecodes (not explicitly shown), where the timecodes may be in any technically feasible format. Timeline cursor graphical control 642 indicates a particular point in time, and a corresponding timecode, within the range of time represented by timeline graphical control 640. The position of timeline cursor graphical control 642 may be changed by selecting timeline cursor graphical control 642 via an input device and moving timeline cursor graphical control 642 to a different position on timeline graphical control 640. This technique is referred to herein as "timeline scrubbing." Play/pause graphical control 644 provides controls to play the animation sequence or to pause the animation sequence.

Although GUI 600 does not include a feedback area, such as feedback area 540 of FIG. 5, such a feedback area could be included in FIG. 6. For example, such a feedback area could include artist recommendations, if any, and feedback from other stakeholders regarding the 3D production asset displayed on GUI 600. The feedback area would display artist recommendations and stakeholder feedback for the hue value and saturation value for the 3D production asset displayed on GUI 600. Via such a feedback area, stakeholders are able to review the preferences of the artist and other stakeholders. In this manner, stakeholders may review the various options and preferences and, thereby, reach a consensus. When the stakeholders reach an agreement with respect to the various options under review, the stakeholders are able to provide unified feedback and approval for these options. The artist then reviews the feedback and approval, by reviewing the appropriate annotation media and/or annotation metadata, and then revises the 3D production asset accordingly.

Figure 7A:
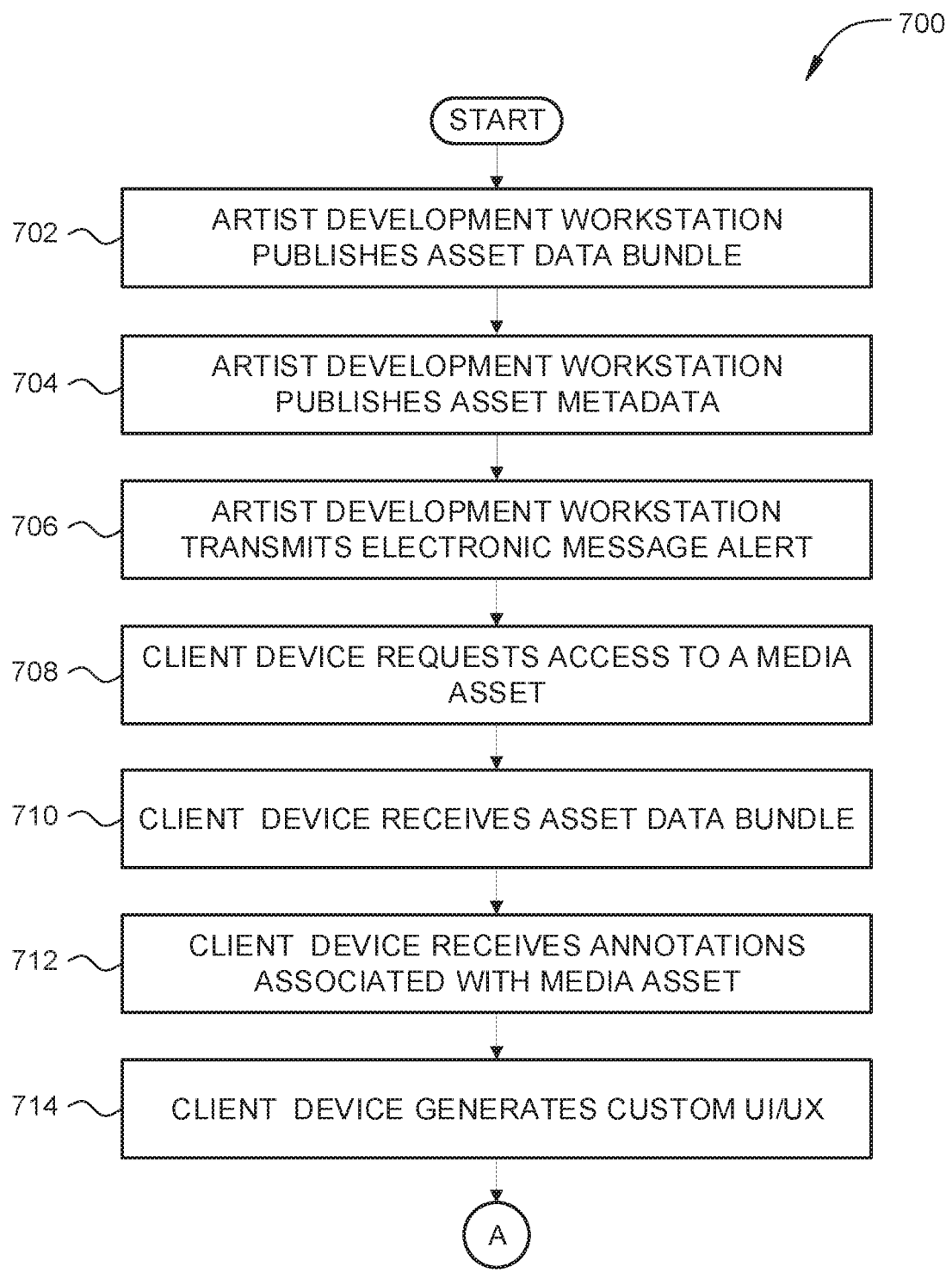
FIGS. 7A-7B set forth a flow diagram of method steps for automatically displaying and providing electronic feedback about a 3D production asset, according to various embodiments of the present invention.
Figure 7B:
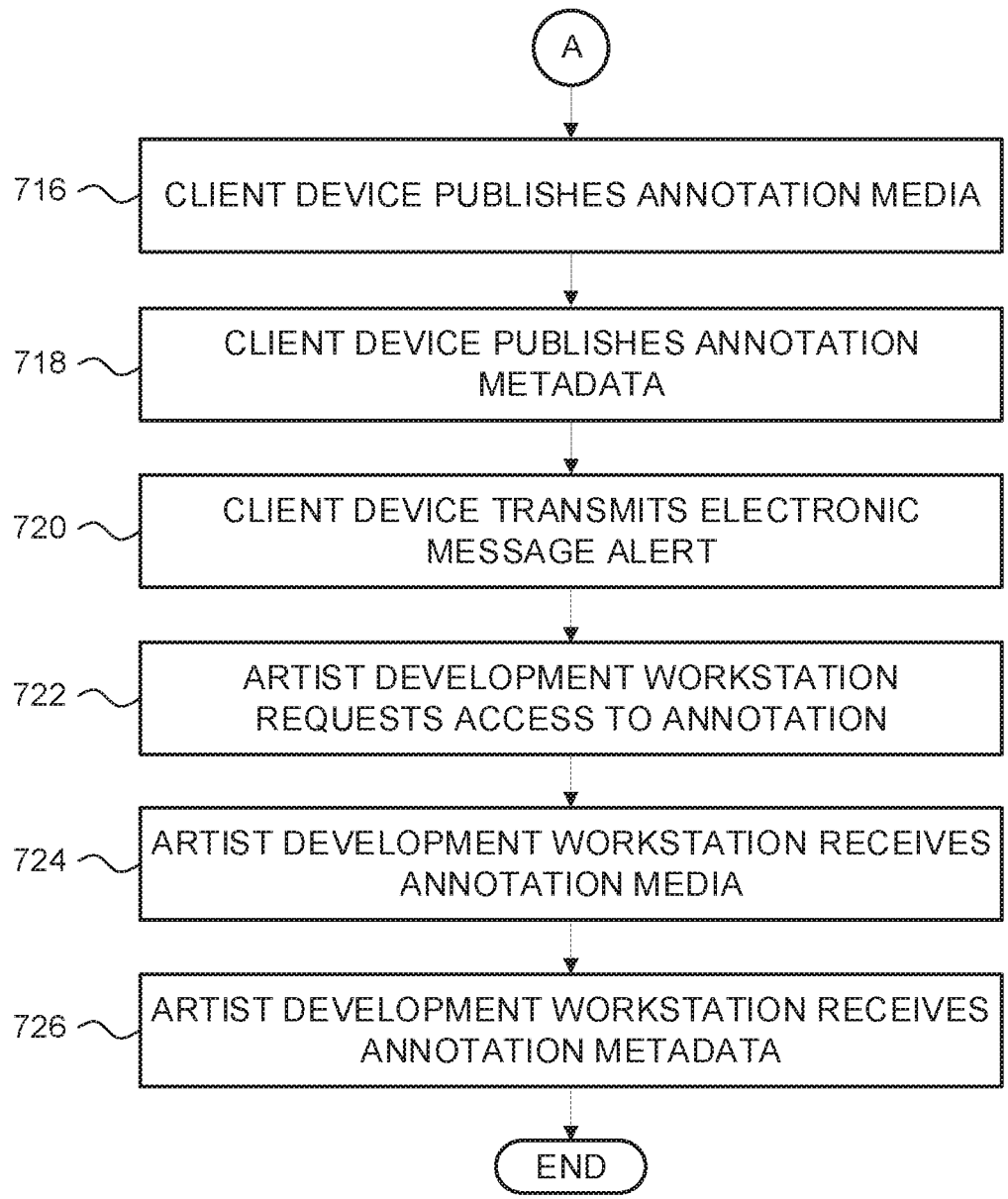

FIGS. 7A-7B set forth a flow diagram of method steps for automatically displaying and providing electronic feedback about a 3D production asset, according to various embodiments of the present invention. Although the method steps are described in conjunction with the systems of FIGS. 1-6, persons of ordinary skill in the art will understand that any system configured to perform the method steps, in any order, is within the scope of the present invention.

As shown, a method 700 begins at step 702, where an artist development workstation 102 publishes a 3D production asset by transmitting an asset data bundle to media content server 104. Typically, the production asset is generated by an artist or other production team member, working at artist development workstation 102, and the asset data bundle is published for review by one or more stakeholders. The asset data bundle may include, without limitation, a downloadable and/or streamable set of 3D models, animation rigs, character skeletal definitions, blend shapes, textures, shaders, materials, animation, vertex caches, lights, cameras, edit decision lists, timecode, sequence layers, scene descriptions, metadata, audio, and text, in any technically feasible combination.

At step 704, artist development workstation 102 publishes the asset metadata corresponding to the asset data bundle by transmitting the asset metadata to production database 106. In general, asset metadata includes information about the corresponding asset data bundle that artist development workstation 102 is publishing for review. At step 706, artist development workstation 102 transmits an electronic message alert to one or more stakeholders to notify the stakeholders that a new production asset is available for creative review. The alert may be in the form of an email, an instant message text, or any other technically feasible notification format.

At step 708, upon receiving the alert, a creative review application 332 executing on client device 108 requests access to the new production asset. At step 710, creative review application 332 receives the asset data bundle from media content server 104. At step 712, creative review application 332 receives the associated asset metadata from production database 106. At step 714, based on data included in one or both of the asset data bundle and asset annotations, creative review application 332 automatically generates a customized GUI and displays the customized GUI on a display device. The customized GUI facilitates receiving electronic feedback about the production assets and distributing that feedback to other machines, such as artist development workstation 102, media content server 104, production database 106.

The customized GUI may be based on the discipline of the artist that generated the production asset, the type of production asset, the role of the stakeholder, and/or any other technically feasible information related to the creative review. Via the customized GUI, the stakeholder may modify one or more characteristics of the production asset. Further, the stakeholder may annotate the production asset via various mechanisms. The annotations are in the form of annotation media and annotation metadata. As further described herein, annotation media generally includes images or other visual elements that indicate changes for the production team to make to the production asset for the next iteration. Annotation media may include, without limitation, text, audio, drawings, diagrams, data structures, data types, and markup, in any technically feasible combination. In some embodiments, annotation media and/or annotation metadata may be attached to a specific point in time along an animation timeline. As further described herein, annotation metadata generally includes textual information and/or binary data values that indicate changes for the production team to make to the production asset for the next iteration. Annotation metadata may include, without limitation, absolute values for parameters associated with the production asset, change values that indicate a value to add to or subtract from parameters associated with the production asset, and values related to the 3D position and orientation of the production asset to which the absolute values and change values apply, in any technically feasible combination. In some embodiments, annotation media and/or annotation metadata may be attached to a specific point in time along an animation timeline. In some embodiments, one or more portions of annotation metadata may link to or refer to corresponding portions of annotation media.

At step 716, after the stakeholder has completed creative review, creative review application 332 publishes the annotation media. In so doing, creative review application 332 transmits the annotation media to media content server 104. At step 718, creative review application 332 publishes the annotation metadata. In so doing, creative review application 332 transmits the annotation metadata to production database 106. Upon receiving the annotation metadata, production database 106 may store the annotation metadata separately from the corresponding asset metadata. Additionally or alternatively, production database 106 may append the annotation metadata to the corresponding asset metadata. At step 720, creative review application 332 transmits an alert to notify the artist and/or one or more other members of the production team that the creative review of the production asset is complete.

At step 722, the artist and/or another production team member request, via artist development workstation 102, access to the annotation media and annotation metadata. At step 724, artist development workstation 102 receives annotation media from media content server 104. Annotation media generally includes images or other visual elements that indicate changes for the production team to make to the production asset for the next iteration. Annotation media may include, without limitation, text, audio, drawings, diagrams, and markup, in any technically feasible combination. In some embodiments, annotation media may be attached to a specific point in time along an animation timeline.

At step 726, artist development workstation 102 receives annotation metadata from production database 106. Annotation metadata may include, without limitation, absolute values for parameters associated with the production asset, change values that indicate a value to add to or subtract from parameters associated with the production asset, and values related to the 3D position and orientation of the production asset to which the absolute values and change values apply, in any technically feasible combination. In some embodiments, annotation metadata may be attached to a specific point in time along an animation timeline.

The artist and/or other production team members may then review the related annotation media and annotation metadata and incorporate the annotations as appropriate for the next round of creative review. The method 700 then terminates.

In sum, a media production system facilitates creative review of 3D production assets during various phases of media production. An artist or other production team member, working at an artist development workstation, generates a 3D production asset for review by one or more stakeholders. The artist development workstation publishes the 3D production asset by transmitting an asset data bundle to a media content server. The asset data bundle may include, without limitation, a downloadable and/or streamable set of 3D models, animation rigs, character skeletal definitions, blend shapes, textures, shaders, materials, animation, vertex caches, lights, cameras, edit decision lists, timecode, sequence layers, scene descriptions, metadata, audio, and text, in any technically feasible combination. In parallel, the artist development workstation publishes asset metadata to a production database. Further, the artist development workstation transmits an alert to one or more stakeholders to notify the stakeholders that a new production asset is available for creative review. The alert may be in the form of an email, an instant message text, or any other technically feasible notification format.

Upon receiving the alert, the stakeholders request access to the 3D production asset via a client device. A creative review application executing on the client device then receives the asset data bundle and associated asset annotations from the media content server and the production database, respectively. Based on data included in one or both of the asset data bundle and asset annotations, the creative review application automatically generates a customized GUI and displays the customized GUI on a display device. The customized GUI facilitates receiving electronic feedback about the production assets and distributing that feedback to other machines, such as artist development workstation 102, media content server 104, production database 106.

The customized GUI may be based on the discipline of the artist that generated the production asset, the type of production asset, the role of the stakeholder, and/or any other technically feasible information related to the creative review. Via the customized GUI, the stakeholder may modify one or more characteristics of the production asset. Further, the stakeholder may annotate the production asset via various mechanisms. The annotations may include, without limitation, text, audio, drawings, diagrams, data structures, data types, and markup, in any technically feasible combination. In some embodiments, annotations may be attached to a specific point in time along an animation timeline.

After the stakeholder has completed creative review, the creative review application publishes the modifications to the characteristics of the production asset as annotation media. The creative review application publishes the annotations as annotation metadata. The creative review application transmits the annotation media and the annotation metadata to the media content server and the production database, respectively. The creative review application transmits an alert to notify the artist and/or one or more other members of the production team that the creative review of the production asset is complete. The artist and/or other production team members then review the related annotation media and annotation metadata and incorporate the annotations as appropriate for the next round of creative review. The annotation media and annotation metadata may include, without limitation, text, audio, drawings, diagrams, data structures, data types, and markup, in any technically feasible combination. In some embodiments, annotation media and/or annotation metadata may be attached to a specific point in time along an animation timeline.

At least one technical advantage of the disclosed techniques relative to the prior art is that stakeholders are able to directly review 3D production assets, including manipulating the production asset in 3D and navigating through the 3D display space. Via a customized graphical user interface (GUI), the stakeholder may adjust certain parameters and be constrained from adjusting other parameters, thereby limiting stakeholder review to specific types of feedback needed by the production team. Further, an executable application and/or other information for generating the customized GUI may be downloaded once, when a new 3D production asset is initially reviewed. As a result, during subsequent review and annotation iterations, only the revised 3D production asset is downloaded without downloading the executable application and/or other information again. Another technical advantage of the disclosed techniques is that stakeholders are automatically notified when new production assets are available. In addition, the production team is automatically notified when new annotation media and metadata for a production asset has been transmitted to a media content server and/or a production database. As a result, creative review of production assets is more efficient, less labor intensive, and more focused relative to prior art approaches. These advantages represent one or more technological improvements over prior art approaches.

1. In some embodiments, a computer-implemented method for automatically displaying and providing electronic feedback about a three-dimensional (3D) production asset includes receiving an asset data bundle associated with the 3D production asset; generating a customized user interface based on at least one aspect of the asset data bundle; displaying the 3D production asset via the customized user interface; receiving an input associated with the 3D production asset via the customized user interface; and causing the input to be transmitted to at least one of a media content server and a production database.

2. The computer-implemented method according to clause 1, wherein generating the customized user interface comprises: identifying a production function associated with a user who generated at least a portion of the 3D production asset; generating a graphical control associated with the production function; and incorporating the graphical control into the customized user interface.

3. The computer-implemented method according to clause 1 or clause 2, wherein generating the customized user interface comprises: identifying an attribute of a graphical object included in the asset data bundle; generating a graphical control associated with the asset data bundle; and incorporating the graphical control into the customized user interface.

4. The computer-implemented method according to any of clauses 1-3, wherein generating the customized user interface comprises: identifying a production function associated with a client device that received at least a portion of the asset data bundle; generating a graphical control associated with the production function; and incorporating the graphical control into the customized user interface.

5. The computer-implemented method according to any of clauses 1-4, wherein the input includes a graphical image, and wherein causing the input to be transmitted comprises causing the graphical image to be transmitted as annotation media to the media content server.

6. The computer-implemented method according to any of clauses 1-5, wherein the input includes a modification of a parameter associated with the 3D production asset, and wherein causing the input to be transmitted comprises causing the modification of the parameter to be transmitted as annotation metadata to the production database.

7. The computer-implemented method according to any of clauses 1-6, further comprising causing a notification to be transmitted to a workstation, wherein the notification indicates that the input associated with the 3D production asset has been transmitted.

8. The computer-implemented method according to any of clauses 1-7, further comprising receiving asset metadata associated with the 3D production asset, wherein generating the customized user interface is further based on at least one aspect of the asset metadata.

9. The computer-implemented method according to any of clauses 1-8, wherein the input includes at least one of annotation media and annotation metadata.

10. In some embodiments, a non-transitory computer-readable storage medium includes instructions that, when executed by a processor, cause the processor to perform the steps of: receiving an asset data bundle associated with a three-dimensional (3D) production asset; generating a customized user interface based on at least one aspect of the asset data bundle; displaying the 3D production asset via the customized user interface; receiving an input associated with the 3D production asset via the customized user interface; and causing the input to be transmitted to at least one of a media content server and a production database.

11. The non-transitory computer-readable storage medium according to clause 10, wherein generating the customized user interface comprises: identifying a production function associated with a user who generated at least a portion of the 3D production asset; generating a graphical control associated with the production function; and incorporating the graphical control into the customized user interface.

12. The non-transitory computer-readable storage medium according to clause 10 or clause 11, wherein generating the customized user interface comprises: identifying an attribute of a graphical object included in the asset data bundle; generating a graphical control associated with the asset data bundle; and incorporating the graphical control into the customized user interface.

13. The non-transitory computer-readable storage medium according to any of clauses 10-12, wherein generating the customized user interface comprises: identifying a production function associated with a client device that received at least a portion of the asset data bundle; generating a graphical control associated with the production function; and incorporating the graphical control into the customized user interface.

14. The non-transitory computer-readable storage medium according to any of clauses 10-13, wherein the customized user interface includes a subset of controls associated with a 3D production application.

15. The non-transitory computer-readable storage medium according to any of clauses 10-14, further comprising: identifying a position on a timeline that corresponds with a timecode the input; and causing the timecode to be transmitted to at least one of a media content server and a production database.

16. The non-transitory computer-readable storage medium according to c any of clauses 10-15, further comprising: identifying at least one of a position and an orientation of the 3D production asset in 3D space as displayed on the customized user interface; and causing the at least one of the position and the orientation to be transmitted to at least one of a media content server and a production database.

17. The non-transitory computer-readable storage medium according to any of clauses 10-16, further comprising receiving asset metadata associated with the 3D production asset, wherein generating the customized user interface is further based on at least one aspect of the asset metadata.

18. In some embodiments, a computing device comprises a memory that includes instructions; and a processor that is coupled to the memory and, when executing the instructions, is configured to: receive an asset data bundle associated with a three-dimensional (3D) production asset; generate a customized user interface based on at least one aspect of the asset data bundle; display the 3D production asset via the customized user interface; receive an input associated with the 3D production asset via the customized user interface; and cause the input to be transmitted to at least one of a media content server and a production database.

19. The computing device according to clause 18, wherein generating the customized user interface comprises: identifying a production function associated with a user who generated at least a portion of the 3D production asset; generating a graphical control associated with the production function; and incorporating the graphical control into the customized user interface.

20. The computing device according to clause 18 or clause 19, wherein generating the customized user interface comprises: identifying an attribute of a graphical object included in the asset data bundle; generating a graphical control associated with the asset data bundle; and incorporating the graphical control into the customized user interface.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically displaying and providing electronic feedback about a three-dimensional (3D) production asset, the method comprising:
   receiving an asset data bundle associated with the 3D production asset;
   identifying, based on at least one aspect of the asset data bundle, a subset of user interface elements of a plurality of user interface elements that are manipulatable to generate the 3D production asset, wherein the subset of user interface elements is to be included in a customized user interface;
   generating the customized user interface based on the subset of the user interface elements;
   displaying the 3D production asset via the customized user interface;
   receiving an input associated with the 3D production asset via the customized user interface; and
   causing the input to be transmitted to at least one of a media content server or a production database.

2. The computer-implemented method of claim 1, wherein generating the customized user interface comprises:
   identifying a production function associated with a user who generated at least a portion of the 3D production asset;

generating a graphical control associated with the production function; and
incorporating the graphical control into the customized user interface.

3. The computer-implemented method of claim 1, wherein generating the customized user interface comprises:
identifying an attribute of a graphical object included in the asset data bundle;
generating a graphical control associated with the asset data bundle; and
incorporating the graphical control into the customized user interface.

4. The computer-implemented method of claim 1, wherein generating the customized user interface comprises:
identifying a production function associated with a client device that received at least a portion of the asset data bundle;
generating a graphical control associated with the production function; and
incorporating the graphical control into the customized user interface.

5. The computer-implemented method of claim 1, wherein the input includes a graphical image, and wherein causing the input to be transmitted comprises causing the graphical image to be transmitted as annotation media to the media content server.

6. The computer-implemented method of claim 1, wherein the input includes a modification of a parameter associated with the 3D production asset, and wherein causing the input to be transmitted comprises causing the modification of the parameter to be transmitted as annotation metadata to the production database.

7. The computer-implemented method of claim 1, further comprising causing a notification to be transmitted to a workstation, wherein the notification indicates that the input associated with the 3D production asset has been transmitted.

8. The computer-implemented method of claim 1, further comprising receiving asset metadata associated with the 3D production asset, wherein generating the customized user interface is further based on at least one aspect of the asset metadata.

9. The computer-implemented method of claim 1, wherein the input includes at least one of annotation media or annotation metadata.

10. A non-transitory computer-readable storage medium including instructions that, when executed by a processor, cause the processor to perform the steps of:
receiving an asset data bundle associated with a three-dimensional (3D) production asset;
identifying, based on at least one aspect of the asset data bundle, a subset of user interface elements of a plurality of user interface elements that are manipulatable to generate the 3D production asset, wherein the subset of user interface elements is to be included in a customized user interface;
generating the customized user interface based on the subset of the user interface elements;
displaying the 3D production asset via the customized user interface;
receiving an input associated with the 3D production asset via the customized user interface; and
causing the input to be transmitted to at least one of a media content server or a production database.

11. The non-transitory computer-readable storage medium of claim 10, wherein generating the customized user interface comprises:

identifying a production function associated with a user who generated at least a portion of the 3D production asset;
generating a graphical control associated with the production function; and
incorporating the graphical control into the customized user interface.

12. The non-transitory computer-readable storage medium of claim 10, wherein generating the customized user interface comprises:
identifying an attribute of a graphical object included in the asset data bundle;
generating a graphical control associated with the asset data bundle; and
incorporating the graphical control into the customized user interface.

13. The non-transitory computer-readable storage medium of claim 10, wherein generating the customized user interface comprises:
identifying a production function associated with a client device that received at least a portion of the asset data bundle;
generating a graphical control associated with the production function; and
incorporating the graphical control into the customized user interface.

14. The non-transitory computer-readable storage medium of claim 10, wherein the customized user interface includes a subset of controls associated with a 3D production application.

15. The non-transitory computer-readable storage medium of claim 10, further comprising:
identifying a position on a timeline that corresponds with a timecode of the input; and
causing the timecode to be transmitted to at least one of a media content server or a production database.

16. The non-transitory computer-readable storage medium of claim 10, further comprising:
identifying at least one of a position and an orientation of the 3D production asset in 3D space as displayed on the customized user interface; and
causing the at least one of the position and the orientation to be transmitted to at least one of a media content server or a production database.

17. The non-transitory computer-readable storage medium of claim 10, further comprising receiving asset metadata associated with the 3D production asset, wherein generating the customized user interface is further based on at least one aspect of the asset metadata.

18. A computing device, comprising:
a memory that includes instructions; and
a processor that is coupled to the memory and, when executing the instructions, is configured to:
receive an asset data bundle associated with a three-dimensional (3D) production asset;
identify, based on at least one aspect of the asset data bundle, a subset of user interface elements of a plurality of user interface elements that are manipulatable to generate the 3D production asset, wherein the subset of user interface elements is to be included in a customized user interface;
generate the customized user interface based on the subset of user interface elements;
display the 3D production asset via the customized user interface;
receive an input associated with the 3D production asset via the customized user interface; and cause the input to be transmitted to at least one of a media content server or a production database.

19. The computing device of claim 18, wherein generating the customized user interface comprises:
    identifying a production function associated with a user who generated at least a portion of the 3D production asset;
    generating a graphical control associated with the production function; and
    incorporating the graphical control into the customized user interface.

20. The computing device of claim 18, wherein generating the customized user interface comprises:
    identifying an attribute of a graphical object included in the asset data bundle;
    generating a graphical control associated with the asset data bundle; and
    incorporating the graphical control into the customized user interface.

* * * * *